(12) United States Patent
Hayashi et al.

(10) Patent No.: US 8,169,774 B2
(45) Date of Patent: May 1, 2012

(54) SOLID ELECTROLYTIC CAPACITOR AND A METHOD FOR MANUFACTURING SAME

(75) Inventors: Nobuhiko Hayashi, Osaka (JP);
Takashi Umemoto, Hirakata (JP);
Hiroshi Nonoue, Hirakata (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 279 days.

(21) Appl. No.: 12/564,523

(22) Filed: Sep. 22, 2009

(65) Prior Publication Data
US 2010/0079930 A1    Apr. 1, 2010

(30) Foreign Application Priority Data

Sep. 30, 2008 (JP) ................................. 2008-254635
Dec. 26, 2008 (JP) ................................. 2008-331996

(51) Int. Cl.
*H01G 4/228* (2006.01)
*H01G 9/145* (2006.01)
*H01G 9/04* (2006.01)

(52) U.S. Cl. ...................... 361/540; 361/528; 361/538
(58) Field of Classification Search .................. 361/528, 361/538, 540; 29/25.03
See application file for complete search history.

(56) References Cited

U.S. PATENT DOCUMENTS

| | | | | |
|---|---|---|---|---|
| 5,469,326 A * | 11/1995 | Kanetake | ...................... | 361/534 |
| 5,693,104 A * | 12/1997 | Kuriyama | ..................... | 29/25.03 |
| 6,970,345 B2 * | 11/2005 | Oh et al. | ........................ | 361/540 |
| 7,082,025 B2 * | 7/2006 | Tamura | ....................... | 361/306.1 |
| 7,400,492 B2 * | 7/2008 | Baba et al. | ..................... | 361/528 |
| 7,835,138 B2 * | 11/2010 | Yamashita et al. | ............ | 361/523 |
| 8,000,086 B2 * | 8/2011 | Okada et al. | .................. | 361/540 |
| 2009/0237866 A1 * | 9/2009 | Okada et al. | .................. | 361/528 |

FOREIGN PATENT DOCUMENTS

JP     05275290 A  * 10/1993
JP     2001-203128 A   7/2001

* cited by examiner

*Primary Examiner* — Eric Thomas
(74) *Attorney, Agent, or Firm* — Marvin A. Motsenbocker; Mots Law, PLLC

(57) ABSTRACT

A first solid electrolytic capacitor according to the present invention includes a capacitor element, an exterior resin covering the capacitor element, an anode terminal, a cathode terminal, and a metal wire. The capacitor element includes an anode body from which an anode lead is extracted, a dielectric layer formed on a surface of the anode body, and a cathode layer formed on the dielectric layer. The anode terminal and the cathode terminal are electrically connected to the anode lead and the cathode layer, respectively, and extracted to an outer surface of the exterior resin, the anode terminal including an opposing part opposed to the anode lead in the exterior resin. The metal wire includes both ends connected to the opposing part and a curving part, and is provided to the anode lead, and at least a part of the curving part is electrically connected to the anode lead.

6 Claims, 21 Drawing Sheets

SOLID ELECTROLYTIC CAPACITOR AND A METHOD FOR MANUFACTURING SAME

The Japanese applications Number 2008-254635 and 2008-331996, upon which this patent application is based, are hereby incorporated by reference.

BACKGROUND OF THE INVENTION

1. Field of the Invention

The present invention relates to a solid electrolytic capacitor characterized in its structure and a method for manufacturing same.

2. Description of Related Art

FIG. 26 is a cross-sectional view of a conventional solid electrolytic capacitor. As shown in FIG. 26, the conventional solid electrolytic capacitor comprises a capacitor element 100, an exterior resin 106 covering the capacitor element 100, an anode terminal 107, and a cathode terminal 108. The capacitor element 100 is formed by, on an outer peripheral surface of an anode body 101 from which a part of an anode lead 102 is extracted, sequentially forming a dielectric layer 103, an electrolyte layer 104, and a cathode layer 105 in this order. The anode terminal 107 is directly connected to an extraction part 102a of the anode lead 102, while the cathode terminal 108 is connected to the cathode layer 105 of the capacitor element 100 via a conductive adhesive 109.

FIG. 27 is a cross-sectional view of a conventional solid electrolytic capacitor showing a base part of the extraction part 102a of the anode lead 102 in a magnified scale. In a molding process for covering the capacitor element 100 with the exterior resin 106, due to curing shrinkage of the exterior resin 106, a stress is applied to the anode lead 102. Therefore, conventional solid electrolytic capacitors are likely to have a problem such that the stress concentrates on the base part of the extraction part 102a of the anode lead 102 to generate a crack or the like on the dielectric layer 103 as shown in FIG. 27, resulting in an increase in leakage current.

In view of this, considered is a countermeasure to fix the base part of the extraction part 102a of the anode lead 102 with a thermoset resin to enhance the strength of the base part of the extraction part 102a of the anode lead 102 against the curing shrinkage of the exterior resin 106, resulting in prevention of the occurrence of cracks.

However, in conventional solid electrolytic capacitors, it is not possible to sufficiently relax a stress generated in welding the anode lead 102 and the anode terminal 107 to each other. Therefore, the stress generated in the welding possibly concentrates on the base part of the extraction part 102a of the anode lead 102 to generate a crack on the dielectric layer 103, resulting in an increase in leakage current.

Also, in conventional solid electrolytic capacitors, it is not possible to sufficiently relax a stress applied to the anode lead 102 in an axial direction thereof. Therefore, due to curing shrinkage of the exterior resin 106, the extraction part 102a of the anode lead 102 is possibly pressed toward the capacitor element 100, resulting in intrusion of the extraction part 102a in the capacitor element 100. When the extraction part 102a is intruded in the capacitor element 100, a crack or the like occurs on the dielectric layer 103 of the capacitor element 100 and the leakage current increases.

SUMMARY OF THE INVENTION

In view of the above described problems, an object of the present invention is to provide a solid electrolytic capacitor in which leakage current is unlikely to be generated.

A first solid electrolytic capacitor according to the present invention comprises a capacitor element, an exterior resin covering the capacitor element, an anode terminal, a cathode terminal, and a metal wire. The capacitor element comprises an anode body from which an anode lead is extracted, a dielectric layer formed on a surface of the anode body, and a cathode layer formed on the dielectric layer. The anode terminal and the cathode terminal are electrically connected to the anode lead and the cathode layer, respectively, and extracted to an outer surface of the exterior resin, the anode terminal including an opposing part opposed to the anode lead in the exterior resin. The metal wire includes both ends connected to the opposing part and a curving part, and is provided to the anode lead, and at least a part of the curving part is electrically connected to the anode lead.

A second solid electrolytic capacitor according to the present invention is the first solid electrolytic capacitor described above, wherein the curving part of the metal wire has flexibility.

A third solid electrolytic capacitor according to the present invention is the first or second solid electrolytic capacitor described above, wherein the curving part of the metal wire has any of a U-shape, a loop shape, and an M-shape, and the curving part and the anode lead intersect each other.

Alternatively, at least a part of the curving part can come into contact with the anode lead by crossing the curving part of the metal wire and the anode lead and then deforming the curving part.

A fourth solid electrolytic capacitor according to the present invention is any of the first to third solid electrolytic capacitors described above, wherein the anode lead and the anode terminal are separated from each other.

A fifth solid electrolytic capacitor according to the present invention is any of the first to fourth solid electrolytic capacitors described above, wherein the solid electrolytic capacitor further comprises a resin layer covering at least a part of a periphery of the metal wire and the anode lead, and the resin layer is formed by a gel-like or rubber-like material.

A sixth solid electrolytic capacitor according to the present invention is any of the first to fifth solid electrolytic capacitors described above, wherein a tip of the anode lead and the curving part of the metal wire are electrically connected to each other by a conductive part, and the conductive part is formed by a conductive resin having curability.

A seventh solid electrolytic capacitor according to the present invention comprises a capacitor element, an exterior resin covering the capacitor element, and a projecting part. The capacitor element comprises an anode body from which an anode lead is extracted, a dielectric layer formed on a surface of the anode body, and a cathode layer formed on the dielectric layer. The projecting part is formed on a side surface of an extraction part of the anode lead extracted from the anode body, and the projecting part is embedded in the exterior resin.

An eighth solid electrolytic capacitor according to the present invention is the seventh solid electrolytic capacitor described above, wherein between a surface from which the extraction part of the anode lead is extracted among outer peripheral surfaces of the capacitor element and the projecting part, at least either of a part of the exterior resin or a resin layer different from the exterior resin is interposed.

A ninth solid electrolytic capacitor according to the present invention is the seventh or eighth solid electrolytic capacitor described above, wherein the projecting part has a stick-like shape, and the projecting part is fixed to the anode lead with an outer peripheral surface of the projecting part being in contact with the side surface of the extraction part of the anode lead.

A tenth solid electrolytic capacitor according to the present invention is the seventh or eighth solid electrolytic capacitor described above, wherein the projecting part has a tubular shape and the projecting part is fixed to the extraction part of the anode lead with the projecting part being fitted along the side surface of the extraction part of the anode lead.

An eleventh solid electrolytic capacitor according to the present invention is any of the seventh to tenth solid electrolytic capacitors described above, wherein the solid electrolytic capacitor further comprises an anode terminal to be electrically connected to the anode lead, and a metal wire for electrically connecting the anode terminal and the projecting part to each other is connected to the anode terminal and the projecting part.

The projecting part is formed by a metal capable of being soldered with the metal wire, and the metal wire is connected to the projecting part by soldering.

A manufacturing method of a solid electrolytic capacitor according to the present invention comprises an anode body forming step, an anode section preparing step, a capacitor element preparing step, and an exterior resin forming step.

In the anode body forming step, formed is an anode body from which an anode lead is extracted.

In the anode section preparing step, prepared is an anode section including a projecting part formed on a side surface of an extraction part of the anode lead extracted from the anode body, and the projecting part disposed on a position separated from a surface from which the extraction part of the anode lead is extracted among outer peripheral surfaces of the anode body.

In the capacitor element preparing step, after the anode section preparing step, a capacitor element is prepared by forming a dielectric layer and a cathode layer on a surface of the anode body in this order.

In the exterior resin forming step, formed is an exterior resin covering the capacitor element by covering the capacitor element with a softened resin material so that the projecting part is embedded in the resin material, and thereafter hardening the resin material. In particular, in this step, between a surface from which the extraction part of the anode lead is extracted among outer peripheral surfaces of the capacitor element and the projecting part, a part of the softened resin material is interposed.

In a particular configuration, the manufacturing method of the solid electrolytic capacitor described above further comprises a resin layer forming step.

In the resin layer forming step, before the exterior resin forming step, a gap generated in a periphery of a base part of the extraction part of the anode lead is covered by forming a resin layer different from the exterior resin formed in the exterior resin forming step on the base part of the extraction part of the anode lead.

BRIEF DESCRIPTION OF THE DRAWINGS

FIG. 14b is a perspective view of the solid electrolytic capacitor according to the first modification shown in FIG. 14a;

FIG. 15b is a perspective view of the solid electrolytic capacitor according to the first modification shown in FIG. 15a;

FIG. 18b is a plain view of the solid electrolytic capacitor according to the fourth modification shown in FIG. 18a;

FIG. 19b is a perspective view of the solid electrolytic capacitor according to the fourth modification shown in FIG. 19a;

FIG. 20 is a plain view showing a status of a resin layer in the solid electrolytic capacitor of the first modification shown in FIG. 14a;

FIG. 21 is a plain view showing a status of a resin layer in the solid electrolytic capacitor of the first modification shown in FIG. 15a;

FIG. 24 is a plain view showing a status of a resin layer in the solid electrolytic capacitor of the fourth modification shown in FIG. 18a;

FIG. 25 is a plain view showing a status of a resin layer in the solid electrolytic capacitor of the fourth modification shown in FIG. 19a;

DETAILED DESCRIPTION OF THE PREFERRED EMBODIMENT

A preferred embodiment of the present invention is discussed in detail below with reference to drawings.

First Embodiment

Figure 1:
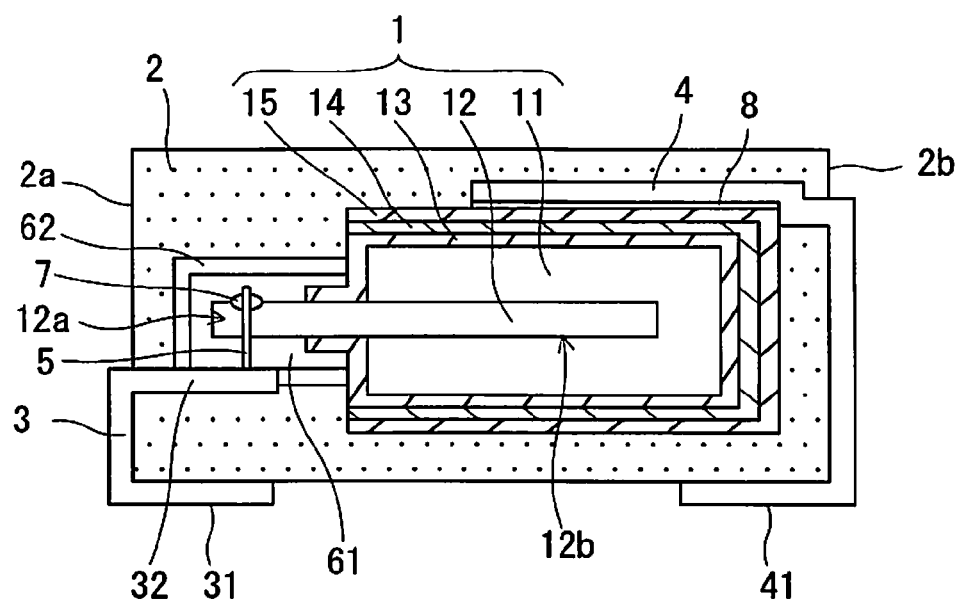
FIG. 1 is a cross-sectional view of a solid electrolytic capacitor according to a first embodiment of the present invention.

FIG. 1 is a cross-sectional view of a solid electrolytic capacitor according to a first embodiment of the present invention. As shown in FIG. 1, the solid electrolytic capacitor of this embodiment comprises a capacitor element 1, an exterior resin 2 covering the capacitor element 1, an anode terminal 3, a cathode terminal 4, a metal wire 5, a first resin layer 61, and a second resin layer 62. A resin material such as epoxy resin is used for the exterior resin 2.

As shown in FIG. 1, the capacitor element 1 comprises an anode body 11, an anode lead 12, a dielectric layer 13, an electrolyte layer 14, and a cathode layer 15. The anode body 11 comprises a porous sintered body made of a valve metal.

Instead of the porous sintered body made of a valve metal, it is possible to use as the anode body 11 a porous body which does not depend on the sintering process, a porous metal material such as three-dimensional reticulated metal material or the like.

The anode lead 12 is extracted from the anode body 11. A part 12a (hereinafter referred to as an extraction part 12a) of the anode lead 12 is extracted from a surface 11a of the anode body 11 and a remaining portion 12b of the anode lead 12 is embedded in the anode body 11. The anode lead 12 is made of a valve metal which is the same kind as or different kind from the valve metal which forms the anode body 11, and electrically connected to the anode body 11.

The valve metal may include, for example, titanium, tantalum, aluminum, niobium, hafnium, zirconium, zinc, tungsten, bismuth, and antimony. In particular, titanium, tantalum, aluminum, and niobium have a high dielectric constant when they are oxidized, and are easy to obtain, and therefore, are preferable materials to form the anode body 11 and the anode lead 12. However, the material of the anode body 11 and the anode lead 12 is not limited to the above mentioned metals, but it may be a metal capable of forming an oxide layer.

Also, the anode body 11 or the anode lead 12 may be made of alloyed metal of those valve metals. Alternatively, the anode body 11 or the anode lead 12 may be made of alloyed metal of a valve metal and another metal. In such a case, it is preferable that the ratio of the valve metal is 50% or more.

The dielectric layer 13 is formed on a surface of the anode body 11, i.e. an outer peripheral surface of the porous sintered body forming the anode body 11 and inner walls of openings (hereinafter referred to as openings of the porous sintered body) defined in the porous sintered body. In particular, by oxidation of the anode body 11, the oxide layer to be the dielectric layer 13 is formed on the outer peripheral surface of the porous sintered body forming the anode body 11 and the inner walls of the openings of the porous sintered body. FIG. 1 shows only a part of the dielectric layer 13 which exists on the outer peripheral surface of the anode body 11.

In the case where the metal forming the anode body 11 is niobium, the dielectric constant of the dielectric layer 13 is around 1.5 times greater than that in the case where the metal is tantalum. Also, in the case where the metal forming the anode body 11 is titanium, the dielectric constant of the dielectric layer 13 is around 2 to 3 times greater than that in the case where the metal is tantalum.

It is preferable that a thickness of the dielectric layer 13 is 10 nm or more and 500 nm or less. If the thickness of the dielectric layer 13 is greater than 500 nm, it is possible that the capacitance decreases and the dielectric layer 13 is detached from the surface of the anode body 11. Also, if the thickness of the dielectric layer 13 is smaller than 10 nm, it is possible that the breakdown voltage decreases and the leakage current increases.

The electrolyte layer 14 is formed on a surface of the dielectric layer 13, i.e. the surface of the dielectric layer 13 formed on the outer peripheral surface of the porous sintered body forming the anode body 11 and the inner walls of openings of the porous sintered body. FIG. 1 shows only a part of the electrolyte layer 14 which exists on the outer peripheral surface of the anode body 11.

For a material of the electrolyte layer 14, used is a conductive inorganic material, a TCNQ (Tetracyano-quinodimethane) complex salt, a conductive polymer or the like. The conductive inorganic material includes manganese dioxide and the like. Also, the conductive polymer includes polypyrrole, polyaniline, polythiophene and the like.

The cathode layer 15 is formed by a carbon layer and a silver paste layer. The carbon layer is formed on the surface of the electrolyte layer 14, and the silver paste layer is formed on the surface of the carbon layer. Thereby the cathode layer 15 is electrically connected to the electrolyte layer 14. The carbon layer is formed by applying a carbon paste to the surface of the electrolyte layer 14 and drying it, and contains carbon particles. The silver paste layer is formed by applying a silver paste to a surface of the carbon layer and drying it, and contains silver particles.

As shown in FIG. 1, the anode terminal 3 has an opposing part 32 disposed in the exterior resin 2. The opposing part 32 is opposed from below to a side surface of the extraction part 12a of the anode lead 12 projecting from the anode body 11. The anode terminal 3 is extracted to an outer surface of the exterior resin 2 and extends along a side surface 2a and a bottom surface of the exterior resin 2. Therefore, an anode terminal surface 31 is exposed from the bottom surface of the exterior resin 2.

The cathode terminal 4 is electrically connected to the cathode layer 15 of the capacitor element 1 via a conductive adhesive 8 in the exterior resin 2. Also, the cathode terminal 4 is extracted to an outer surface of the exterior resin 2 and extends along a side surface 2b and the bottom surface of the exterior resin 2. Therefore, a cathode terminal surface 41 is exposed from the bottom surface of the exterior resin 2.

Figure 2:
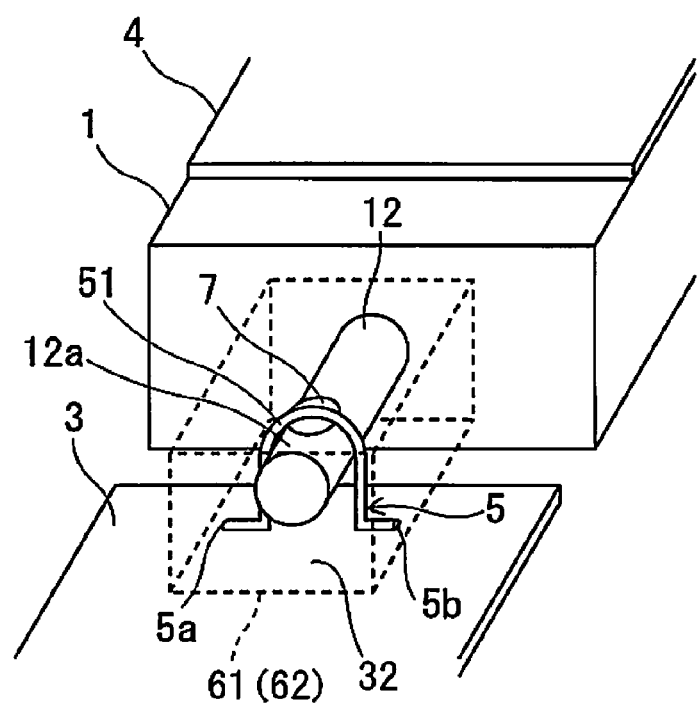
FIG. 2 is an enlarged perspective view of a main part of the solid electrolytic capacitor.

FIG. 2 is an enlarged perspective view of a part adjacent to the metal wire 5, illustrating the part without the exterior resin 2, the first resin layer 61 or the second resin layer 62. Location of the first resin layer 61 is indicated by dotted lines in the figure. As shown in FIG. 2, the metal wire 5 is provided to the extraction part 12a of the anode lead 12 projecting from the anode body 11.

In particular, the metal wire 5 includes a curved part 51 having an inverted U-shape, and both ends 5a and 5b connected to the opposing part 32 of the anode terminal 3. The extraction part 12a of the anode lead 12 crosses an area surrounded by the curved part 51 of the metal wire 5 and the anode terminal 3, being in contact with a part of the curved part 51 as shown in FIG. 2. In this embodiment, the extraction part 12a of the anode lead 12 passes through the area. The extraction part 12a of the anode lead 12 is in contact with the curved part 51 of the metal wire 5 so that little force is applied from the anode lead 12 to the metal wire 5. The anode lead 12 and the metal wire 5 are thus electrically connected to each other.

Figure 3:
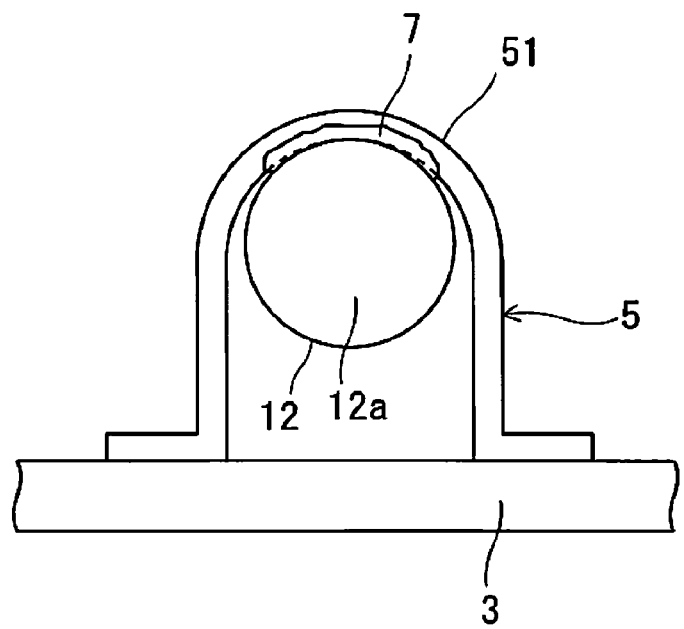
FIG. 3 is an front view of the solid electrolytic capacitor viewed from an anode lead side.

FIG. 3 is an front view of the solid electrolytic capacitor viewed from the anode lead 12 side, illustrating the connection status of the anode lead 12 and the metal wire 5. As shown in FIG. 3, the anode lead 12 crossing the metal wire 5 is disposed separated from the anode terminal 3.

For the metal wire 5, used is a wire which can be easily curved (deformed), i.e. a wire formed by a metal such as, for example, gold, copper, aluminum or the like. In particular, a wire made of gold can be easily curved (deformed), and therefore, preferable for the metal wire 5. This is because, even if a stress is applied to the metal wire 5, the stress can be relaxed by the deformation of the metal wire 5. Gold is preferable also because it has a higher volume conductivity than that of other metals.

The curved part 51 of the metal wire 5 is formed by a wire bonder. The curved part 51 formed by the wire bonder has a flexibility and can be flexibly deformed in response to the applied force. Here, "flexibility" means that, when a force is applied to the metal wire 5, the metal wire 5 can be deformed in response to the force.

In the periphery of a contact part of the metal wire 5 and the anode lead 12, as shown in FIGS. 1 to 3, a conductive part 7 is formed by applying a conductive resin having curability to enhance conductivity between the anode lead 12 and the metal wire 5 and fix the metal wire 5 to the anode lead 12, thereby maintaining good electrical or mechanical connection status between the anode lead 12 and the metal wire 5. The part of the metal wire 5 and the anode lead 12 on which the conductive resin is applied to be the conductive part 7 is hereinafter referred to as a connection part.

Even in the case where the anode lead 12 is disposed separated from the metal wire 5 when the extraction part 12a of the anode lead 12 crosses the curved part 51 of the metal wire 5, it is possible to electrically or mechanically connect the anode lead 12 and the metal wire 5 to each other by filling the gap defined between the anode lead 12 and the metal wire 5 with the conductive part 7.

It is possible to adopt silver past, a resin which contains conductive particles such as carbon or the like, or a solder material or the like for the conductive resin having curability.

It is possible to further reduce the stress applied between the anode lead 12 and the metal wire 5 by adopting a conductive resin adhesive having flexibility as the conductive part 7.

The first resin layer 61 covers the metal wire 5 and the anode lead 12 inside the exterior resin 2 as shown in FIG. 1 to protect the connection part of the curved part 51 of the metal wire 5 and the extraction part 12a of the anode lead 12. In particular, the first resin layer 61 is made of a rubber-like or gel-like material having flexibility and softer than a degree of penetration (JIS K2220 ¼ cone) of 50 (around Young's modulus of $10^4$ Pa), and covers the whole metal wire 5 including both ends 5a, 5b, the connection part of the curved part 51 of the metal wire 5 and the extraction part 12a of the anode lead 12, the extraction part 12a of the anode lead 12 extracted from the anode body 11, and a base part of the extraction part 12a of the anode lead 12.

Since the first resin layer 61 is made of a material softer than the degree of penetration of 50 (around Young's modulus of $10^4$ Pa), it may be difficult to perform a molding process of the exterior resin 2 directly after forming the first resin layer 61.

Therefore, in the solid electrolytic capacitor according to this embodiment, in order to facilitate the forming of the exterior resin 2, an outer surface of the first resin layer 61 is covered by the second resin layer 62 having a higher Young's modulus than that of the first resin layer 61. In particular, for the second resin layer 62, adopted is a material such as silicone resin, epoxy resin, acrylate resin or the like, which is harder than a rubber hardness (JIS K6253, type A) of 5 (around Young's modulus of $10^6$ Pa).

In this embodiment, the first resin layer 61 covers an area from the connection part of the curved part 51 of the metal wire 5 and the extraction part 12a of the anode lead 12 to a position adjacent to the base part of the extraction part 12a of the anode lead 12, and the second resin layer 62 covers the first resin layer 61. However, it is also possible that the area is covered only by the first resin layer 61. In such a case, the molding process of the exterior resin 2 may be performed after forming the first resin layer 61 by appropriately adjusting the softness of the first resin layer 61 by adjusting the degree of penetration or Young's modulus. Also, in such a case, it is possible to protect the connection part of the curved part 51 of the metal wire 5 and the extraction part 12a of the anode lead 12.

In the solid electrolytic capacitor described above, only by the intersection of the curved part 51 of the metal wire 5 and the anode lead 12, in other words, only by the penetration of the extraction part 12a of the anode lead 12 between the curved part 51 of the metal wire 5 having the inverted U-shape and the anode terminal 3, the anode lead 12 comes into contact with the metal wire 5, thereby electrically connecting the anode lead 12 and the metal wire 5 to each other.

Also, only by applying the conductive resin to the connection part of the anode lead 12 and the metal wire 5, it is possible to maintain good electrical or mechanical connection status between the anode lead 12 and the metal wire 5.

Thus, by electrically connecting the anode lead 12 and the anode terminal 3 via the metal wire 5, it is possible to inhibit the force applied to the anode lead 12, resulting in a reduction in the stress applied to the base part of the extraction part 12a of the anode lead 12. Therefore, it is possible to inhibit the generation of a crack (defection) or the like on the dielectric layer 13 adjacent to the base part of the extraction part 12a of the anode lead 12, thereby preventing the generation of the leakage current.

Since the anode lead 12 and the anode terminal 3 are electrically connected to each other by the metal wire 5 which can be easily curved (deformed), even in the case where a stress is applied from the extending direction of the anode lead 12, the stress is relaxed by deformation of the metal wire 5.

The solid electrolytic capacitor comprises a variety of materials, which have different thermal expansion coefficients. Therefore, in the case where these materials expand or contract due to heat, a stress is generated in the solid electrolytic capacitor. In particular, the stress is easily generated between the anode lead 12 and the anode terminal 3.

However, in the solid electrolytic capacitor according to this embodiment, the anode lead 12 and the anode terminal 3 are connected to each other by the metal wire 5, and the curved part 51 of the metal wire 5 has flexibility. Therefore, in the case where the anode lead 12, the anode terminal 3, the exterior resin 2 or the like expands or contracts due to heat, the stress generated between the anode lead 12 and the anode terminal 3 is absorbed by the metal wire 5. Thus, it is possible to enhance the reliability of the connection of the anode lead 12 and the anode terminal 3.

Further, in the solid electrolytic capacitor according to this embodiment, the anode lead 12 is disposed separated from the anode terminal 3. Therefore, in the case where a stress is applied externally, the stress applied to the base part of the extraction part 12a of the anode lead 12 is relaxed more easily compared to the structure in which the anode lead 12 and the anode terminal 3 are in direct contact. This is because the separation of the anode lead 12 and the anode terminal 3 facilitates the deformation of the metal wire 5 when a stress is applied externally.

In the solid electrolytic capacitor described above, since the first resin layer 61 covers the area from the connection part of the curved part 51 of the metal wire 5 and the extraction part 12a of the anode lead 12 to the position adjacent to the base part of the extraction part 12a of the anode lead 12, it is possible to protect the connection part of the curved part 51 of the metal wire 5 and the extraction part 12a of the anode lead 12, thereby enhancing the reliability of the connection of the anode lead 12 and the anode terminal 3.

Also, according to the first resin layer 61, it is possible to relax the stress generated when the anode lead 12, the anode terminal 3, the exterior resin 2 or the like expands or contracts due to heat and applied to the connection part of the curved part 51 of the metal wire 5 and the extraction part 12a of the anode lead 12 and the base part of the extraction part 12a of the anode lead 12.

Thus, it is possible to inhibit generation of a gap between the anode lead 12 and the anode body 11, and generation of a crack (defection) or the like on the dielectric layer 13 adjacent to the base part of the extraction part 12a of the anode lead 12. As a result, generation of the leakage current is inhibited.

Further, since the first resin layer 61 is made of a soft material, it is possible to relax the stress generated when the curved part 51 of the metal wire 5 is deformed.

Further, in the solid electrolytic capacitor described above, since both ends 5a, 5b of one metal wire 5 is connected to the anode terminal 3 and at least a part of the curved part 51 is electrically connected to the anode lead 12, two current paths are formed by the metal wire 5 between the anode lead 12 and the anode terminal 3.

Therefore, it is possible to reduce ESR generated between the anode lead 12 and the anode terminal 3, compared to that in the structure in which the end 5a of the metal wire 5 is connected to the anode lead 12 and the other end 5b is connected to the anode terminal 3 to define only one current path.

For example, in the case where the anode lead 12 is a lead made of niobium having a diameter of 0.3 mm, and the metal wire 5 is a wire made of gold having a diameter of 100 μm, if there is only one current path defined by the metal wire 5 as described above, the ESR possibly increases compared to that in the structure in which the anode terminals 3 are directly connected to the anode lead 12.

However, two current paths are defined by the metal wire 5 in the solid electrolytic capacitor of this embodiment, whereby it is possible to reduce the ESR to around a degree equivalent to that in the structure in which the anode terminals 3 are directly connected to the anode lead 12.

Further, in the solid electrolytic capacitor described above, the metal wire 5 has the inverted U-shape, and its both ends 5a and 5b are connected to the anode terminal 3. Therefore, in the process of hardening the conductive resin applied to the periphery of the connection part of the anode lead 12 and the metal wire 5, the metal wire 5 is almost never displaced from a predetermined position where the anode lead 12 and the metal wire 5 are to be connected to each other.

Also, in the solid electrolytic capacitor according to this embodiment, the metal wire 5 has the inverted U-shape, and the anode lead 12 penetrates the area surrounded by the metal wire 5 and the anode terminal 3. Therefore, it is possible to inhibit poor connection due to the position displacement better than in the case where an end of the metal wire 5 is directly connected to the anode lead 12.

Also, it is possible to inhibit the force applied when the connection is carried out from being applied to the base part better than in the case where an end of the metal wire 5 is mechanically connected to the anode lead 12 directly.

Further, in the solid electrolytic capacitor according to this embodiment, the curved part 51 of the metal wire 5 and the extraction part 12a of the anode lead 12 are mechanically connected to each other by the conductive part 7 made of the conductive resin. Thus, by connecting the metal wire 5 and the anode lead 12 by the conductive part 7, the force applied when the connection is carried out can be reduced, and as a result, the stress applied to the base part of the extraction part 12a of the anode lead 12 is reduced. Thus, it is possible to inhibit a crack (defection) or the like from being generated on the dielectric layer 13 adjacent to the base part of the extraction part 12a of the anode lead 12, thereby preventing the generation of the leakage current.

Also, by connecting the metal wire 5 and the anode lead 12 by the conductive part 7, the stress applied to the base part of the extraction part 12a of the anode lead 12 can be reduced compared to that in the structure in which the anode lead 12 and the anode terminal 3 are directly connected by welding or the like.

Table 1 shown below shows a result of an experiment for verifying the effect described above. In this verification experiment, prepared were ten samples S of the solid electrolytic capacitor of this embodiment of the present invention and ten each of comparative samples X1 to X3. A voltage of ten V was applied to each sample, and the leakage current was measured 300 seconds after starting the application. Table 1 shows average values of the leakage currents of ten samples.

Both in the sample S and the comparative samples X1 to X3, first, the solid electrolytic capacitor was prepared as described below. Niobium metal powder having a primary particle diameter of around 0.5 μm was molded into a rectangular parallelepiped form. A compact thereby formed was vacuum sintered with the remaining portion 12b of the anode lead 12 embedded in the compact. Thereby formed was a porous sintered body having a height of around 4.4 mm, a width of around 1.0 mm, and a length of around 3.3 mm. For the anode lead 12, adopted was a lead made of niobium having a diameter of 0.3 mm.

Then, the porous sintered body was immersed in phosphoric acid aqueous solution (around 0.4 wt %) kept at around 30 degrees Celsius, and a voltage of 50 V was applied for 10 hours to form the dielectric layer 13 on a surface of the porous sintered body.

Further, by a chemical polymerization method, the electrolyte layer 14 made of polypyrrole was formed on the surface of the dielectric layer 13. And then, the carbon layer and the silver paste layer (cathode layer 15) were formed by applying and drying the carbon paste and the silver paste in order.

The sample S was prepared as described below using the prepared solid electrolytic capacitor.

First, the cathode terminal 4 was bonded to the cathode layer 15 using the conductive adhesive, to electrically connect the cathode layer 15 and the cathode terminal 4 to each other.

The metal wire 5 made of gold having a diameter of 100 μm was attached to the anode terminal 3 so as to have the inverted U-shape as shown in FIG. 2. And then, in order to electrically connect the anode lead 12 and the metal wire 5 to each other, the extraction part 12*a* of the anode lead 12 penetrated the area surrounded by the curved part 51 of the metal wire 5 and the anode terminal 3, and an upper end surface of the extraction part 12*a* came into contact with the curved part 51 as shown in FIG. 3. Thereafter, the silver paste was applied to the periphery of the connection part of the anode lead 12 and the metal wire 5 and hardened, to form the conductive part 7.

And then, a silicone resin TSE3051L, a product of Momentive Performance Materials Inc., preheated at 95 degrees Celsius (for 30 minutes) was applied by a dispenser to the whole metal wire 5, the extraction part 12*a* of the anode lead 12 projecting from the anode body 11, and the base part of the extraction part 12*a* of the anode lead 12 to cover those parts with the silicone resin TSE3051L. And then, by hardening the silicone resin TSE3051L at 100 degrees Celsius (for 30 minutes), the first resin layer 61 was formed. The hardened TSE3051L has a degree of penetration of 65.

Further, a silicone resin TSE3253, a product of Momentive Performance Materials Inc., was applied by a dispenser to the outer surface of the first resin layer 61 to cover the outer surface of the first resin layer 61 with the silicone resin TSE3253. And then, by hardening the silicone resin TSE3253 at 100 degrees Celsius (for 30 minutes), the second resin layer 62 was formed. The hardened TSE3253 has a rubber hardness of 30.

Thereafter, by using a transfer mold method, the capacitor element 1 was covered with a seal member including epoxy resin and imidazole compound to form the exterior resin 2. In particular, the seal member preheated to 160 degrees Celsius was poured into a mold at a pressure of 80 kg/cm$^2$ to cover the capacitor element 1. And then, the seal member was hardened at 160 degrees Celsius (for 90 seconds).

The comparative samples X1 to X3 were prepared as described below.

Figure 26:
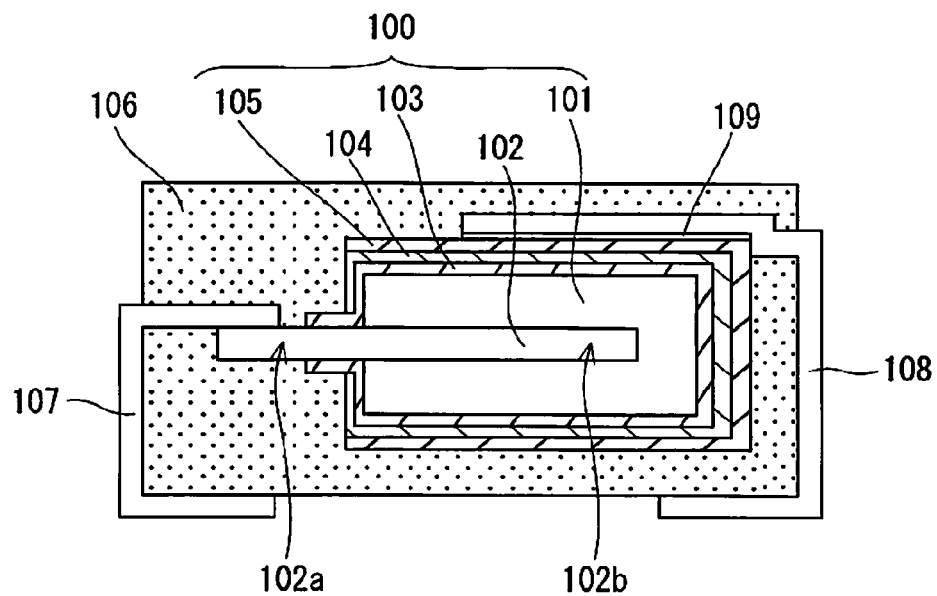
FIG. 26 is a cross-sectional view of a conventional solid electrolytic capacitor.
Figure 27:
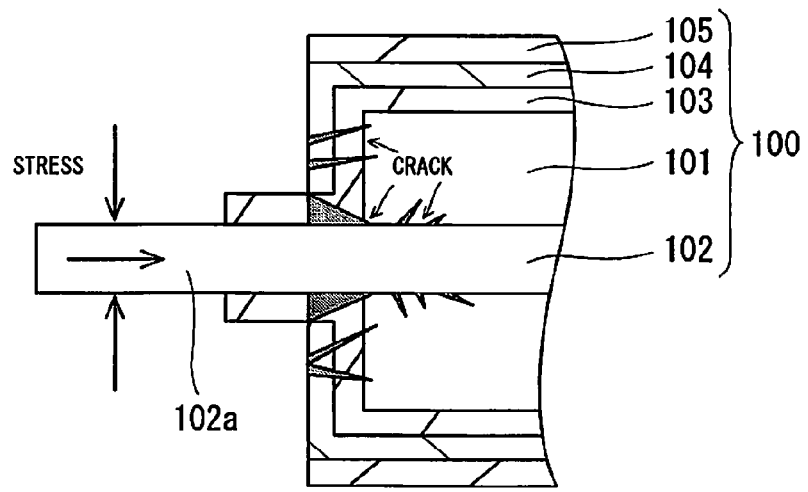
FIG. 27 is a cross-sectional view of the conventional solid electrolytic capacitor showing a base part of an extraction part of an anode lead in a magnified scale.

In the process of preparing the sample S, instead of electrically connecting the anode lead 12 and the anode terminal 3 to each other and forming the first resin layer 61 and the second resin layer 62, the anode terminal 3 was directly connected to the anode lead 12 by welding to form the comparative sample X1 (See FIG. 26. The anode lead is indicated by a reference symbol 102, and the anode terminal is indicated by a reference symbol 107 in FIG. 26.).

Figure 9:
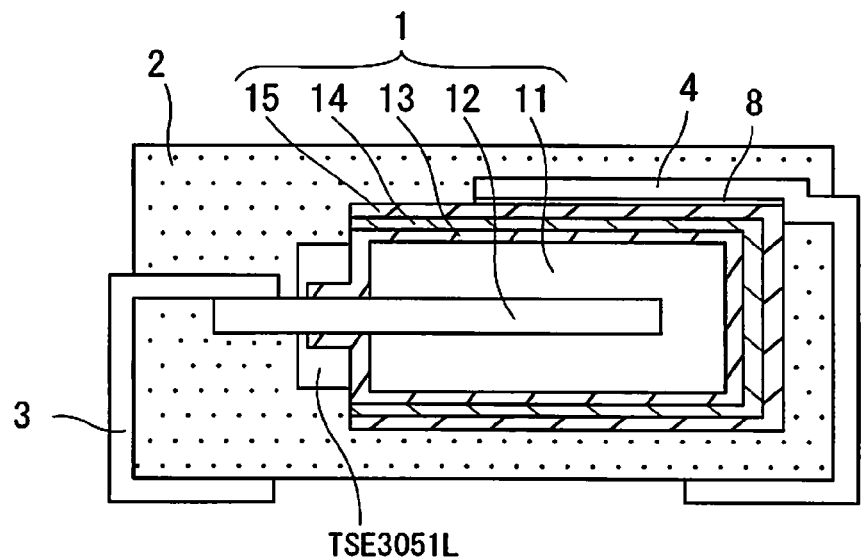
FIG. 9 is a cross-sectional view of an example of a comparative sample.

Also, after directly connecting the anode terminal 3 to the anode lead 12, the silicone resin TSE3051L was applied by a dispenser only to the periphery of the base part of the extraction part 12*a* of the anode lead 12, and was hardened at 100 degrees Celsius (for 30 minutes) to form the comparative sample X2 (See FIG. 9).

Figure 10:
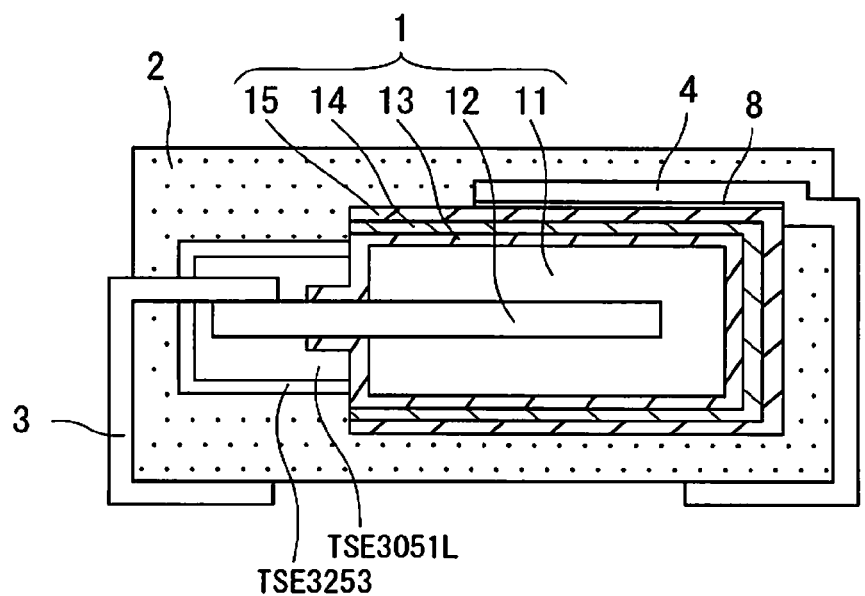
FIG. 10 is a cross-sectional view of another example of a comparative sample.

Also, after directly connecting the anode terminal 3 to the anode lead 12, the silicone resin TSE3051L was applied not only to the base part of the extraction part 12*a* of the anode lead 12, but to whole the anode lead 12, and was hardened at 100 degrees Celsius (for 30 minutes), and further, the silicone resin TSE3253 was applied to an outer surface of the silicone resin TSE3051L by a dispenser and was hardened at 100 degrees Celsius (for 30 minutes) to form the comparative sample X3 (See FIG. 10).

As a result of measuring the leakage currents of the sample S and the comparative samples X1 to X3, as shown in Table 1, the leakage currents were 8 μA in the sample S, 103 μA in the sample X1, 41 μA in the sample X2, and 15 μA in the sample X3.

Compared to the samples X1 and X2, it can be seen, in the sample S, that the generation of the leakage current is significantly prevented. The reason of this is considered to be that, in the sample S, a gap is unlikely generated between the anode lead 12 and the anode body 11, and a crack is not unlikely generated on the dielectric layer 13.

In particular, in the sample X1, since the anode lead 12 and the anode terminal 3 are connected by welding, the stress is applied to the base part of the extraction part 12*a* of the anode lead 12, and therefore, a crack is generated on the dielectric layer 13, resulting in an increase in the leakage current.

Also, in the sample X2, although the silicone resin TSE3051L covers the base part of the extraction part 12*a* of the anode lead 12, the stress applied to the base part of the extraction part 12*a* of the anode lead 12 when the welding is carried out is not reduced adequately, resulting in the increase in the leakage current.

Further, compared to the sample X3, it can be seen, in the sample S, that the generation of the leakage current is significantly prevented. The reason of this is considered to be that, by connecting the anode lead 12 and the anode terminal 3 to each other using the metal wire 5, the stress applied to the base part of the extraction part 12*a* of the anode lead 12 is reduced, and therefore, a crack is unlikely to be generated on the dielectric layer 13, resulting in a decrease in the leakage current.

TABLE 1

|  | LEAKAGE CURRENT (μA) |
| --- | --- |
| SAMPLE S | 8 |
| COMPARATIVE SAMPLE X1 | 103 |
| COMPARATIVE SAMPLE X2 | 41 |
| COMPARATIVE SAMPLE X3 | 15 |

Figure 4:
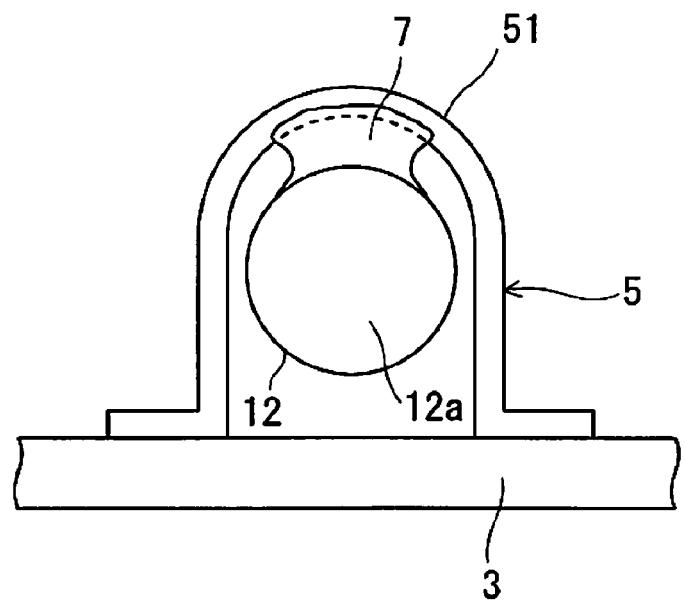
FIG. 4 is a front view showing a connection status of an anode lead and a metal wire in a solid electrolytic capacitor of a first modification.

FIG. 4 is a front view showing a first modification of the solid electrolytic capacitor described above. As shown in FIG. 4, in the solid electrolytic capacitor described above, the extraction part 12*a* of the anode lead 12 may penetrate the area surrounded by the curved part 51 of the metal wire 5 having the inverted U-shape and the anode terminal 3 without coming into contact with the curved part 51, in other words, being separated from the curved part 51.

In such a case, in order to electrically connect the anode lead 12 and the metal wire 5 to each other, the conductive part 7 is formed by filling the conductive resin having curability between the anode lead 12 and the curved part 51 of the metal wire 5.

Figure 5A:
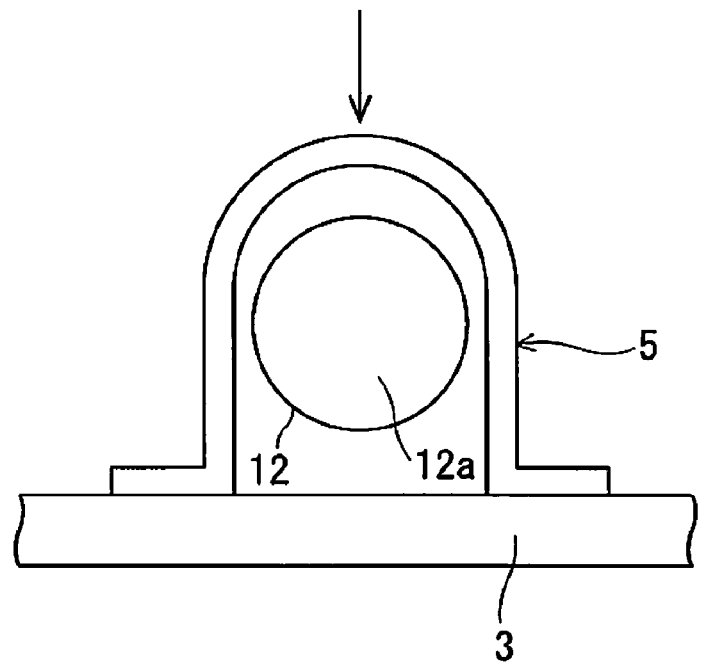
FIG. 5a is a front view showing a connection status of an anode lead and a metal wire in another solid electrolytic capacitor of the first modification.
Figure 5B:
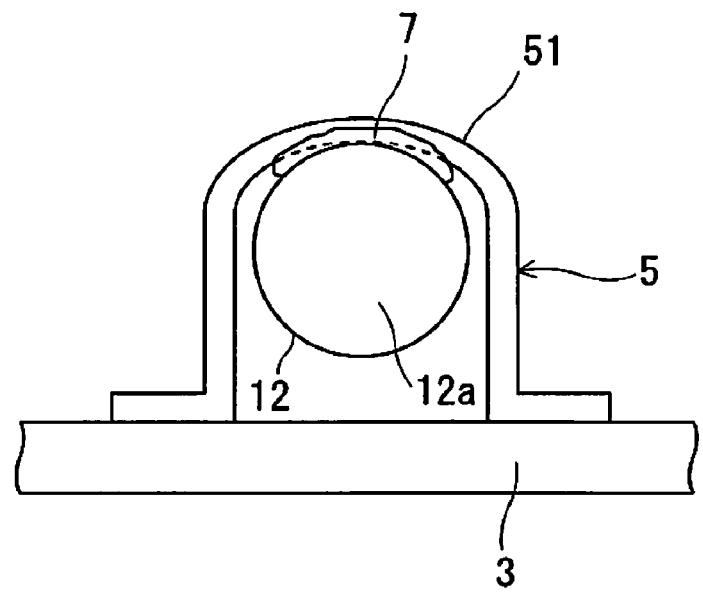
FIG. 5b is a front view showing a connection status of an anode lead and a metal wire in another solid electrolytic capacitor of the first modification.

Alternatively, the curved part 51 may come into contact with the anode lead 12 by, after the extraction part 12*a* of the anode lead 12 penetrates the area between the curved part 51 of the metal wire 5 and the anode terminal 3, applying a force from above to the metal wire 5 as shown in FIG. 5*a*, and thereby deforming the curved part 51 as shown in FIG. 5*b*.

In the solid electrolytic capacitor of the first modification described above, in the process of electrically connecting the anode lead 12 and the anode terminal 3 to each other, the metal wire 5 and the anode lead 12 do not come into contact with each other. The metal wire 5 and the anode lead 12 are electrically or mechanically connected to each other by the conductive part.

Therefore, compared to the structure in which the metal wire 5 and the anode lead 12 are in contact with each other, it is possible to reduce the force applied to the anode lead 12. Thus, it is possible to inhibit a crack (defection) or the like from being generated on the dielectric layer 13 adjacent to the base part of the extraction part 12a of the anode lead 12, thereby inhibiting the generation of the leakage current.

In the modification shown in FIG. 4, since it is not necessary to deform the curved part 51 of the metal wire 5 so as to come into contact with the anode lead 12, in this modification, it is possible to reduce the force applied to the anode lead 12 more than in the modification shown in FIG. 5, thereby effectively inhibiting the generation of a crack on the dielectric layer 13.

Figure 6:
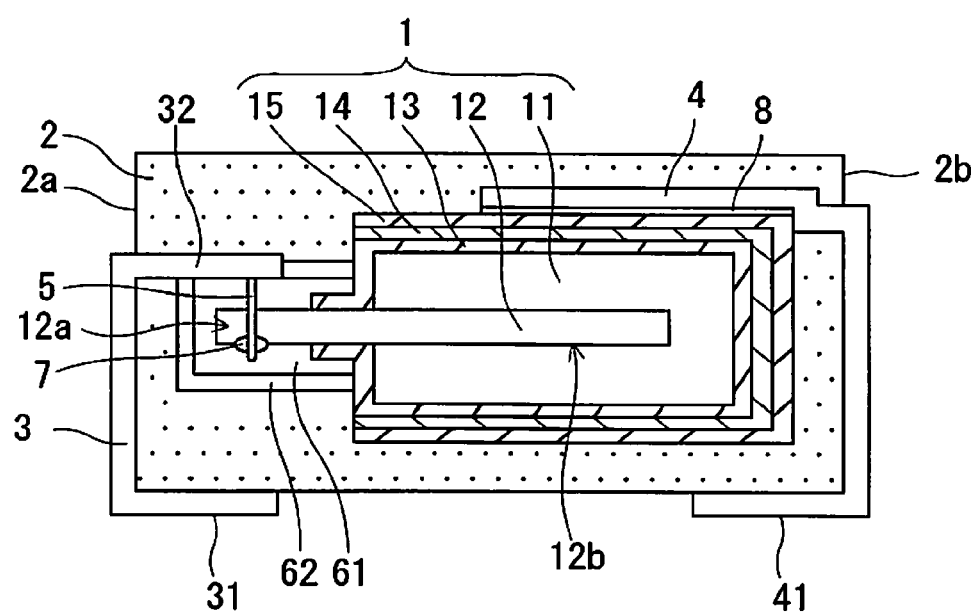
FIG. 6 is a cross-sectional view of a solid electrolytic capacitor of a second modification.

FIG. 6 is a cross-sectional view showing a second modification of the solid electrolytic capacitor described above. As shown in FIG. 6, in the solid electrolytic capacitor described above, the opposing part 32 of the anode terminal 3 may be opposed from above to the side surface of the extraction part 12a of the anode lead 12 projecting from the anode body 11, and the metal wire 5 may be disposed in the U-shape. In such a configuration also, obtained is the similar effect as that in the solid electrolytic capacitor described above.

Figure 7A:
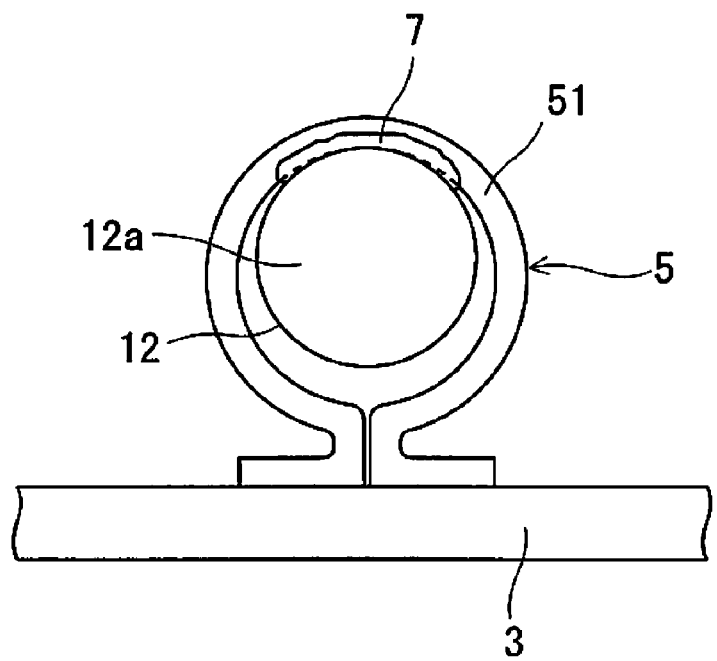
FIG. 7a is a front view showing a shape of a metal wire in a solid electrolytic capacitor of a third modification.

FIG. 7a is a front view showing a third modification of the solid electrolytic capacitor described above. As shown in FIG. 7a, in the solid electrolytic capacitor described above, the shape of the metal wire 5 may be a loop shape.

In such a configuration also, it is possible to electrically connect the anode lead 12 and the anode terminal 3 to each other only by the penetration of the extraction part 12a of the anode lead 12 through an area surrounded by the curved part 51 curved into the loop shape with applying little force to the anode lead 12 in a similar manner to the above.

Also, in the solid electrolytic capacitor described above, as shown in FIG. 7b, the shape of the metal wire 5 may be M-shape. In such a case, the extraction part 12a of the anode lead 12 is connected from above to the curved part 51 having the M-shape.

According to such a configuration, the position displacement is unlikely to occur compared to the configuration in which the extraction part 12a of the anode lead 12 penetrates the curved part 51 having the loop shape or U-shape.

Figure 7B:
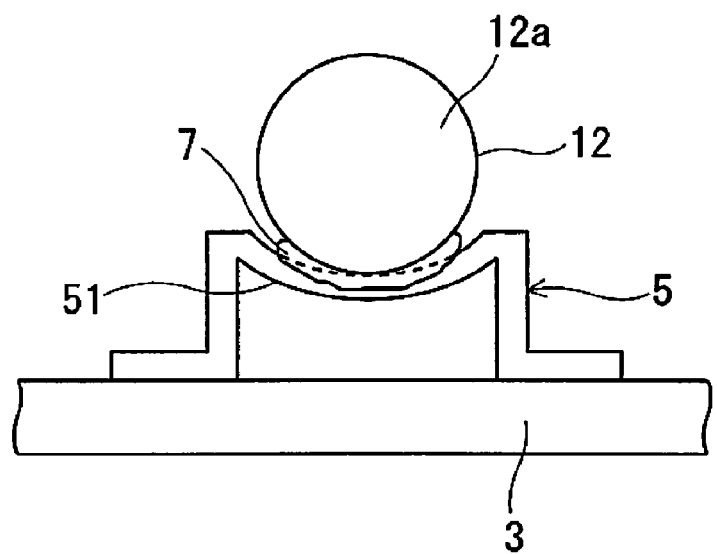
FIG. 7b is a front view showing another shape of the metal wire in the solid electrolytic capacitor of the third modification.

In the modification shown in FIG. 7b, in a similar manner to the solid electrolytic capacitor described above (see FIG. 3), the anode lead 12 is disposed being separated from the anode terminal 3. Therefore, the stress applied to the base part of the extraction part 12a of the anode lead 12 is likely to be reduced compared to the structure in which the anode lead 12 and the anode terminal 3 are in direct contact with each other.

Figure 8:
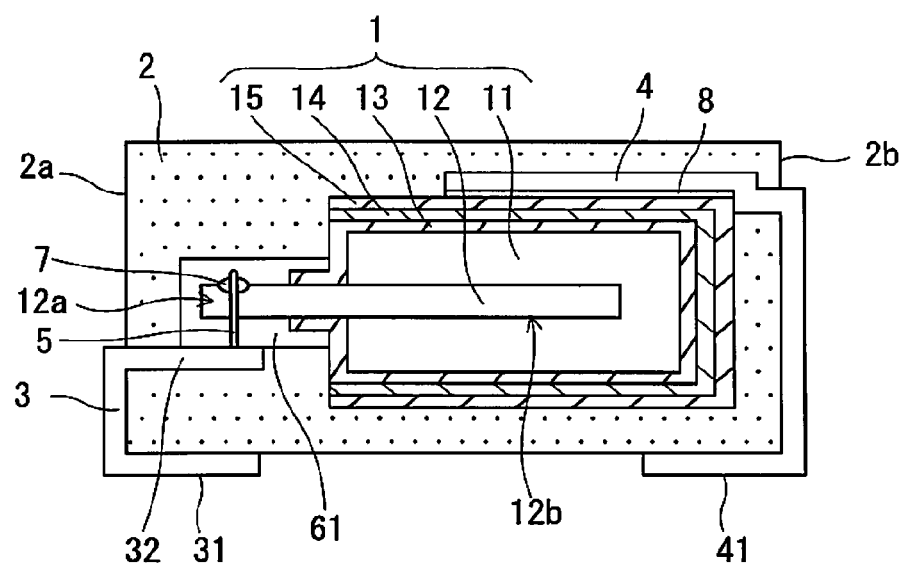
FIG. 8 is a cross-sectional view of a solid electrolytic capacitor of a fourth modification.

FIG. 8 is a cross-sectional view showing a fourth modification of the solid electrolytic capacitor described above. As shown in FIG. 8, in the solid electrolytic capacitor described above, it is possible to form only the first resin layer 61 without forming the second resin layer 62. In such a configuration also, a compressive stress generated in the process of curing shrinkage of the exterior resin 2 is unlikely to be conducted to the anode lead 12. As a result, in the molding process of the exterior resin 2, the stress does not concentrate on the base part of the extraction part 12a of the anode lead 12.

However, in order to prevent the first resin layer 61 from separating from the metal wire 5 in the molding process of the exterior resin 2, it is preferable that the material of the first resin layer 61 is harder than the degree of penetration of 50 (around Young's modulus of $10^4$ Pa).

The present invention is not limited to the foregoing first embodiment in construction but can be modified variously within the technical range set forth in the appended claims.

For example, the metal wire 5 is not limited to the wire made of gold, copper, or aluminum, but it is possible to adopt a variety of wires capable of being easily curved (deformed).

Also, the material of the first resin layer 61 is not limited to the silicone resin, but it is possible to adopt a variety of rubber-like or gel-like soft materials. The material of the second resin layer 62 is not limited to silicone resin, epoxy resin, or acrylate resin, but it is possible to adopt a variety of materials harder than the first resin layer 61.

Further, the material of the conductive part 7 is not limited to the silver past, the resin which contains conductive particles such as carbon or the like, and the solder material, but it is possible to adopt a variety of materials having curability and conductivity.

Second Embodiment

Figure 11:
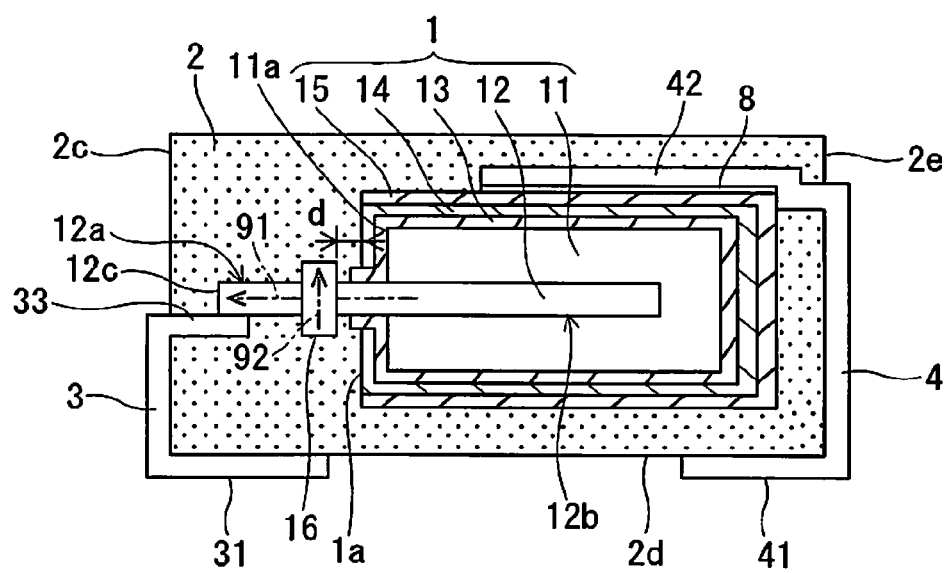
FIG. 11 is a cross-sectional view of a solid electrolytic capacitor according to a second embodiment of the present invention.

FIG. 11 is a cross-sectional view of a solid electrolytic capacitor according to a second embodiment of the present invention. As shown in FIG. 11, the solid electrolytic capacitor of this embodiment comprises a capacitor element 1, a projecting part 16, an exterior resin 2 covering the capacitor element 1 and the projecting part 16, an anode terminal 3, a cathode terminal 4, and a resin layer 63. The capacitor element 1 is the same as the one described above in the first embodiment. A resin material such as epoxy resin or the like is used for the exterior resin 2. In FIG. 11, the resin layer 63 is not shown.

In this embodiment, as shown in FIG. 11, of the outer peripheral surfaces of the capacitor element 1, the cathode layer 15 is formed on a different area from the surface 1a from which the anode lead 12 is extracted. On the surface 1a of the capacitor element 1, a part of the electrolyte layer 14 is exposed.

Figure 12:
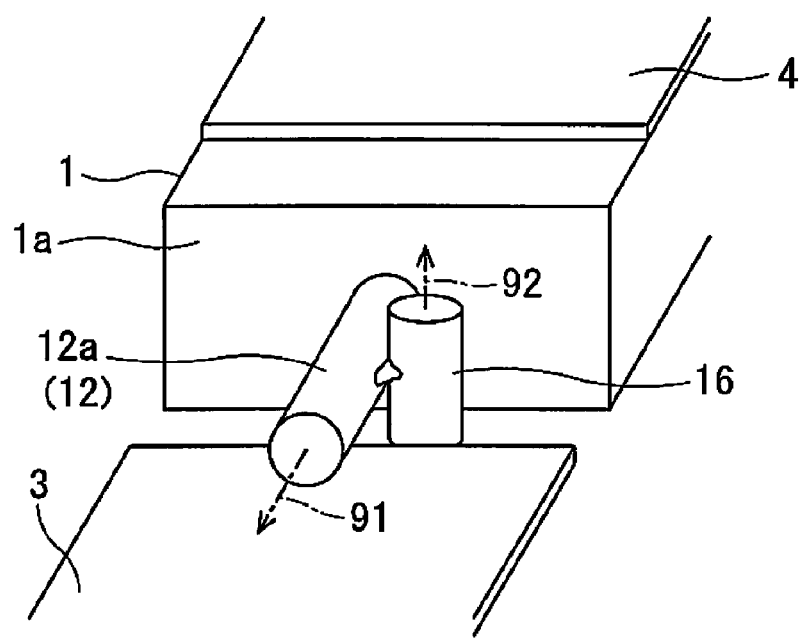
FIG. 12 is a perspective view showing a part adjacent to an extraction part of an anode lead of the solid electrolytic capacitor according to the second embodiment of the present invention in a magnified scale.

FIG. 12 is a perspective view showing in a magnified scale a part adjacent to the extraction part 12a of the anode lead 12 of the solid electrolytic capacitor shown in FIG. 11. In FIG. 12, the exterior resin 2 is not shown.

As shown in FIG. 12, the projecting part 16 is attached to the side surface of the extraction part 12a of the anode lead 12. In particular, the projecting part 16 is formed by a cylindrical metal piece, and an outer peripheral surface of the projecting part 16 is in contact with the side surface of the extraction part 12a of the anode lead 12 from the side, and the projecting part 16 is fixed to the anode lead 12 so that an axial direction 92 thereof is generally perpendicular to an axial direction 91 of the anode lead 12.

As shown in FIG. 11, a part of the exterior resin 2 is interposed between the projecting part 16 and the surface 1a, from which the anode lead 12 is extracted, among the outer peripheral surfaces of the capacitor element 1. Thus, the projecting part 16 is disposed so as to have a gap between the projecting part 16 and the capacitor element 1, and embedded in the exterior resin 2.

The shape of the projecting part 16 is not limited to a cylindrical shape, and may be other shapes. In the case where the shape of the projecting part 16 is a cylindrical shape, it is easy to attach the projecting part 16 to the anode lead 12. As the shape of the projecting part 16, it is possible to adopt various shapes such as a stick shape, a spherical shape, a conical shape, a quadrangular pyramid shape, or an ellipsoidal shape. That is, the projecting part 16 may have any other shape as long as it can be arranged so as to have a gap between the projecting part 16 and the capacitor element 1, and can be embedded in the exterior resin 2.

Figure 13:
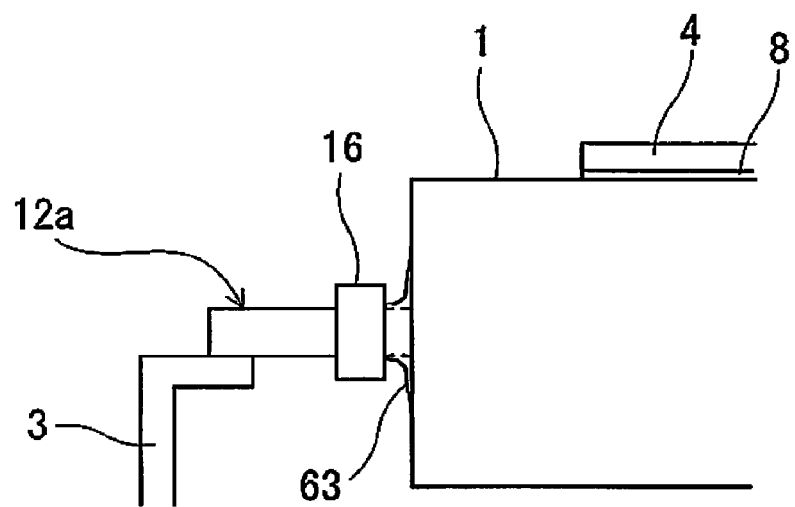
FIG. 13 is a plain view of the part adjacent to the extraction part of the anode lead of the solid electrolytic capacitor according to the second embodiment of the present invention viewed from side.

FIG. 13 is a plain view of a part adjacent to the extraction part 12a of the anode lead 12 of the solid electrolytic capacitor shown in FIG. 11 viewed from side. In FIG. 13, the exterior resin 2 is not shown.

A gap is likely to be generated between the base part of the extraction part 12a of the anode lead 12 and the anode body 11 in the calcinations of the anode body 11 and the anode lead 12. The generated gap may remain even after forming the dielectric layer 13 or the electrolyte layer 14 without being filled by the dielectric layer 13 or the electrolyte layer 14.

By forming the resin layer 63 on the base part of the extraction part 12a of the anode lead 12 as shown in FIG. 13, the gap (not shown) generated around the base part is covered by the resin layer 63. For the material of the resin layer 63, used is the resin material such as silicone resin, epoxy resin or the like.

The anode terminal 3 and the cathode terminal 4 are embedded in the exterior resin 2 as shown in FIG. 11, and have an anode terminal surface 31 and a cathode terminal surface 41 exposed on a bottom surface 2d of the exterior resin 2 respectively. A conductive material such as nickel or the like is adopted as a material of the anode terminal 3 and the cathode terminal 4.

In particular, an end 33 of the anode terminal 3 is electrically connected to the extraction part 12a of the anode lead 12. The anode terminal 3 is extracted to a surface 2c of the exterior resin 2, to which the surface 1a of the capacitor element 1 is opposed, and then, the anode terminal 3 extends along the surface 2c and the bottom surface 2d of the exterior resin 2. Therefore, the anode terminal surface 31 is exposed from the bottom surface 2d of the exterior resin 2.

In contrast, an end 42 of the cathode terminal 4 is electrically connected to the cathode layer 15 of the capacitor element 1 via a conductive adhesive 8. The cathode terminal 4 is extracted to a surface 2e of the exterior resin 2, opposite to the surface 2c, and then, the cathode terminal 4 extends along the surface 2e and the bottom surface 2d of the exterior resin 2. Therefore, the cathode terminal surface 41 is exposed from the bottom surface 2d of the exterior resin 2.

Described below is a manufacturing method of the solid electrolytic capacitor described above. In this manufacturing method, performed in order are an anode body forming step, an anode section preparing step, a capacitor element preparing step, a terminal connecting step, a resin layer forming step, and an exterior resin forming step.

In the anode body forming step, powder of a valve metal is molded into a rectangular parallelepiped form to form a compact. Thereafter, the remaining part 12b of the anode lead 12 is embedded in the compact so that a part (extraction part 12a) of the anode lead 12 is extracted from the compact, and the compact is sintered in this state. Thereby a porous sintered body is formed from the compact to form the anode body 11 having a surface 11a from which the anode lead 12 is extracted.

In the anode section preparing step, the cylindrical metal piece to become the projecting part 16 is fixed by welding to the side surface of the extraction part 12a of the anode lead 12 to prepare an anode section comprising the anode body 11, the anode lead 12 and the projecting part 16.

Here, the outer peripheral surface of the projecting part 16 is in contact with the side surface of the extraction part 12a of the anode lead 12 from the side, and the projecting part 16 is disposed so that the axial direction 92 thereof is perpendicular to the axial direction 91 of the anode lead 12. Also, the projecting part 16 is disposed on the side surface of the extraction part 12a so that the projecting part 16 is separated from the surface 1a from which the extraction part 12a is extracted, among the outer peripheral surfaces of the capacitor element 1 when the capacitor element 1 is prepared in the capacitor element preparing step to be described later.

For example, in the case where the anode lead 12 has a diameter of 0.3 mm, a cylindrical metal piece having the same diameter as that of the anode lead 12 of 0.3 mm, and a length of 0.8 mm is used for the projecting part 16, and the projecting part 16 is disposed so that the distance between the axis passing through the center of the projecting part 16 and the surface 1a of the capacitor element 1 is 0.4 mm. In such a case, a space is defined between the projecting part 16 and the surface 1a of the capacitor element 1. A width d (see FIG. 11) of the space is 0.25 mm.

By using the projecting part 16 which has the same diameter as that of the anode lead 12, the projecting part 16 is easily welded to the anode lead 12.

The capacitor element preparing step is a process performed after the anode section preparing step described above, and comprises a dielectric layer forming step, an electrolyte layer forming step, and a cathode layer forming step.

In the dielectric layer forming step, the anode body 11 is immersed in an electrolysis solution such as phosphoric acid aqueous solution or the like to be electrochemically oxidized (anodic oxidation). Since the electrolysis solution permeates inside the openings of the porous sintered body forming the anode body 11, an oxide layer is formed on not only the outer peripheral surface of the porous sintered body, but also inner wall of the openings of the porous sintered body. The oxide layer forms the dielectric layer 13.

In the electrolyte layer forming step, an electrolyte such as a conductive inorganic material, a TCNQ complex salt, or a conductive polymer is applied to the surface of the dielectric layer 13 to form the electrolyte layer 14 on the outer peripheral surface of the anode body 11.

A part of the applied electrolyte permeates inside the openings of the porous sintered body to cover the surface of the dielectric layer 13 formed on the inner walls of the openings, and therefore, inside the porous sintered body also, the electrolyte layer 14 is formed on the surface of the dielectric layer 13.

In the cathode layer forming step, a carbon paste is applied to the electrolyte layer 14 and dried to form a carbon layer containing carbon particles. In this embodiment, the carbon layer is formed in a different area from the surface from which the extraction part 12a is extracted among the outer peripheral surfaces of the electrolyte layer 14.

Thereafter, the silver paste is applied to the surface of the carbon layer and dried to form a silver paste layer containing silver particles. The cathode layer 15 is thereby formed.

In the terminal connecting step, the end 33 of the anode terminal 3 is electrically connected to the extraction part 12a of the anode lead 12 by welding. Here, before connecting the anode terminal 3 to the anode lead 12, a tip part of the anode lead 12 is cut so that a length of the extraction part 12a from the surface 1a of the capacitor element 1 is 1.4 to 1.5 mm.

Also, the end 42 of the cathode terminal 4 is electrically connected to the cathode layer 15 of the capacitor element 1 via the conductive adhesive 8.

In the resin layer forming step, the resin material such as, for example, silicone resin, epoxy resin or the like is applied on the base part of the extraction part 12a of the anode lead 12 to form the resin layer 63 different from the exterior resin 2. The gap generated around the base part is thereby covered by the resin layer 63.

In the exterior resin forming step, the capacitor element 1 is covered with the resin material such as epoxy resin or the like softened by preheating. A space between the surface 1a of the capacitor element 1 from which the extraction part 12a of the anode lead 12 is extracted and the projecting part 16 is filled with a part of the softened resin material, and thereafter, the resin material is maintained at 160 degrees Celsius for 90 seconds to be hardened by heat to form the exterior resin 2.

Thereafter, the anode terminal 3 is bent along the surface 2c and the bottom surface 2d of the exterior resin 2, while the cathode terminal 4 is bent along the surface 2e and the bottom surface 2d of the exterior resin 2. Thereby the anode terminal surface 31 of the anode terminal 3 and the cathode terminal surface 41 of the cathode terminal 4 are defined on the bottom surface 2d of the exterior resin 2. Thus, the solid electrolytic capacitor shown in FIG. 11 is prepared.

According to the solid electrolytic capacitor described above, in the case where the stress is applied to the anode lead 12 in the axis direction 91 due to curing shrinkage of the exterior resin 2, in other words, in the case where a tip surface 12c of the anode lead 12 (see FIG. 11) is pushed toward the capacitor element 1, the projecting part 16 is received by the exterior resin 2 interposed between the projecting part 16 and the capacitor element 1. Thus, the extraction part 12a of the anode lead 12 is inhibited from further intruding in the capacitor element 1. Therefore, even in the case of the curing shrinkage of the exterior resin 2, a crack (defection) is unlikely generated on the dielectric layer 13 of the capacitor element 1. Thereby prevented is the generation of the leakage current.

However, since the resin material interposed between the surface 1a of the capacitor element 1 and the projecting part 16 also has curing shrinkage, the extraction part 12a of the anode lead 12 further intrudes in the capacitor element 1 by the amount of the shrinkage of the resin material interposed therebetween. Therefore, it is preferable that the width d of the space between the surface 1a of the capacitor element 1 and the projecting part 16 is small. This is because when the width d of the space is small, the amount of the shrinkage of the resin material filled in the space is also small, and a crack (defection) is unlikely generated on the dielectric layer 13 of the capacitor element 1.

Preferably, the shrinkage amount of the resin material filled in the space is 0.2 mm or smaller. The shrinking percentage of the resin material used for the exterior resin 2 is around 0.2 to 0.5%. Therefore, in the case where, for example, the width d of the space is 0.25 mm, the shrinkage amount of the resin material filled in the space is around 0.5 to 1.25 μm. Also, in the case where the width d of the space is 0.4 mm, the shrinkage amount of the resin material filled in the space is around 0.8 to 2 μm.

However, when the width d of the space is too small, in the case where the size or the fixing location of the projecting part 16 varies, the projecting part 16 possibly comes into contact with the cathode layer 15 to short-circuit.

Therefore, in the solid electrolytic capacitor described above, by providing the space between the surface 1a of the capacitor element 1 and the projecting part 16, the projecting part 16 does not come into contact with the cathode layer 15 even in the case where the size or fixing location of the projecting part 16 varies.

In order to surely prevent the contact between the projecting part 16 and the cathode layer 15, it is preferable that the width d of the space is 0.1 mm or greater.

Accordingly, in order to prevent both the generation of a crack (defection) and contact between the projecting part 16 and the cathode layer 15, it is preferable that the width d of the space is 0.1 to 0.4 mm.

In this embodiment, before the dielectric layer 13 is formed in the capacitor element preparing step, the projecting part 16 is fixed to the anode lead 12 by welding in the anode section preparing step. Therefore, the generation of a crack (defection) is prevented due to the fixing of the projecting part 16 to the anode lead 12.

Also, since it is possible to weld the projecting part 16 to the anode lead 12 without generating a crack or the like on the dielectric layer 13, the weld strength between the projecting part 16 and the anode lead 12 can be enhanced. Therefore, even when the stress is applied to the projecting part 16 due to curing shrinkage of the exterior resin 2, the projecting part 16 is not detached from the anode lead 12.

Further, in the solid electrolytic capacitor of this embodiment, before the exterior resin forming step is performed, the resin layer 63 is formed in the resin layer forming step, and the resin layer 63 covers the gap generated around the base part of the extraction part 12a of the anode lead 12. Therefore, the softened resin material used in the exterior resin forming step does not permeates inside the capacitor element 1 via the gap.

Also, after the resin material used in the exterior resin forming step is hardened, even when a force is applied to the extraction part 12a of the anode lead 12 for some reason, concentration of the stress on the base part is relaxed by the resin layer 63.

It is not necessary to form the above described resin layer 63 in the case where it is not possible that the softened resin material permeates inside the capacitor element 1 via the gap in the exterior resin forming step, in the case where the characteristics of the capacitor element 1 is not affected by the resin material even if it permeates inside, or in the case where the stress almost never concentrates on the base part of the extraction part 12a after the resin material is hardened. Therefore, in such a case, it is not necessary to provide the resin layer forming step in the manufacturing method.

Even in the case where the resin layer 63 is not formed, the effect due to providing the projecting part 16, i.e. the effect of inhibiting the extraction part 12a of the anode lead 12 from further intruding in the capacitor element 1 is not prevented.

Further, in the prepared solid electrolytic capacitor, the resin layer 63 is disposed between the surface 1a of the capacitor element 1 and the projecting part 16. Therefore, even in the case where a soft resin material is used as a material of the resin layer 63, the projecting part 16 inhibits the resin material from exuding to the surface of the exterior resin 2 after passing along the side surface of the anode lead 12.

Table 2 shown below shows a result of an experiment for verifying the effect described above. In this verification experiment, prepared were ten samples S1, ten samples S2, which are the solid electrolytic capacitors shown in FIG. 11 having widths d of the spaces of 0.25 mm, 0.65 mm respectively, and ten samples X which are the solid electrolytic capacitors without the projecting part 16. A voltage of 10 V was applied to each sample and the leakage current 300 seconds after starting applying voltage was measured. Table 2 shows average values of ten samples.

Both samples S1 and S2 were prepared in the same manner as the solid electrolytic capacitor described above. In particular, in the anode body forming step, niobium metal powder having a primary particle diameter of around 0.5 μm was molded into a rectangular parallelepiped form. A compact thereby formed was vacuum sintered with a part (the extraction part 12a) of the anode lead 12 extracted from the compact. Thereby prepared was a porous sintered body which is the anode body 11.

In this experiment, the porous sintered body has a height of around 4.4 mm, a width of around 1.0 mm, and a length of around 3.3 mm. For the anode lead 12, adopted was a lead made of niobium having a diameter of 0.3 mm.

In the anode section preparing step, a cylindrical metal piece which is to be the projecting part 16 is fixed to the side surface of the extraction part 12a of the anode lead 12 by welding. The projecting part 16 is disposed so that its outer peripheral surface comes into contact with the side surface of the extraction part 12a of the anode lead 12 from the side, and the axial direction 92 thereof is perpendicular to the axial direction 91 of the anode lead 12.

A cylindrical metal piece having a diameter of 0.3 mm and a length of 0.8 mm is used for the projecting part 16. The diameter of the projecting part 16 is the same as that of the anode lead 12.

In the sample S1, the projecting part 16 is disposed so that the distance between the axis passing through the center of the projecting part 16 and the surface 1a of the capacitor element 1 is 0.4 mm. That is, a width d (see FIG. 11) of the space between the projecting part 16 and the surface 1a of the capacitor element 1 is 0.25 mm.

In the sample S2, the projecting part 16 is disposed so that the distance between the axis passing through the center of the projecting part 16 and the surface 1a of the capacitor element 1 is 0.8 mm. That is, a width d (see FIG. 11) of the space between the projecting part 16 and the surface 1a of the capacitor element 1 is 0.65 mm.

In the capacitor element preparing step, the porous sintered body which is the anode body 11 was immersed in phosphoric acid aqueous solution (around 0.4 wt %) kept at around 30° C., and a voltage of 50 V was applied for 10 hours to form the dielectric layer 13 on the surface of the porous sintered body in the dielectric layer forming step.

And then, in the electrolyte layer forming step, by a chemical polymerization method, polypyrrole was applied to the surface of the dielectric layer 13 to form the electrolyte layer 14 on the surface of the dielectric layer 13.

Thereafter, in the cathode layer forming step, the carbon paste and the silver paste were, in this order, applied and dried to form the carbon layer and silver paste layer which form the cathode layer 15.

In the terminal connecting step, used is the capacitor element 1 prepared in the capacitor element preparing step. The anode terminal 3 is electrically connected to the extraction part 12a of the anode lead 12 by welding, while the cathode terminal 4 is electrically connected to the cathode layer 15 of the capacitor element 1 by the conductive adhesive 8.

In the resin layer forming step, the silicone resin TSE3051L, a product of Momentive Performance Materials Inc., preheated at 95 degrees Celsius (for 30 minutes) was applied by a dispenser to the base part of the extraction part 12a of the anode lead 12. And then, by hardening the silicone resin TSE3051L at 100 degrees Celsius (for 30 minutes), the resin layer 63 was formed. The hardened TSE3051L has a degree of penetration of 65.

In the sample S1, the resin layer 63 is formed along the side surface of the anode lead 12 from the surface 1a of the capacitor element 1 to the projecting part 16. In the sample S2, the resin layer 63 is formed along the side surface of the anode lead 12 from the surface 1a of the capacitor element 1 to the position separated by 0.6 mm from the surface 1a of the capacitor element 1.

In the exterior resin forming step, by using the transfer mold method, the capacitor element 1 was covered with the seal member including epoxy resin and imidazole compound to form the exterior resin 2. In particular, the seal member preheated to 160 degrees Celsius was poured into a mold by a pressure of 80 kg/cm² to cover the capacitor element 1. And then, the seal member was hardened at 160 degrees Celsius (for 90 seconds).

The comparative sample X is prepared in the same manner as the sample S2 described above. However, the anode section preparing step was omitted in the comparative sample X. That is, the comparative sample X is the conventional solid electrolytic capacitor which does not have the projecting part 16 on the anode lead 12 (See FIG. 26. The anode lead is given a reference symbol 102 in FIG. 26.).

A result of the measurement of the leakage currents in the samples S1, S2, and X shows that the leakage currents were 32 µA in the sample S1, 83 µA in the sample S2, and 91 µA in the sample X as shown in Table 2.

Compared to the comparative sample X, in the samples S1 and S2, it can be seen that the generation of the leakage current is prevented. The reason of this is considered to be that, in the samples S1 and S2, the projecting part 16 is received by the exterior resin 2 interposed between the projecting part 16 and the capacitor element 1, and a crack (defection) or the like is unlikely generated on the dielectric layer 13 of the capacitor element 1.

Further, compared to the sample S2, in the sample S1, it can be seen that the leakage current is significantly reduced. The reason of this is considered to be that, in the sample S1, the width d of the space between the surface 1a of the capacitor element 1 and the projecting part 16 is made small and thereby the shrinkage amount of the resin material filled in the space decreases to considerably reduce the number of cracks (defection) or the like generated on the dielectric layer 13.

TABLE 2

| | LEAKAGE CURRENT (µA) |
| --- | --- |
| SAMPLE S1 | 32 |
| SAMPLE S2 | 83 |
| COMPARATIVE SAMPLE X | 91 |

Figure 14A:
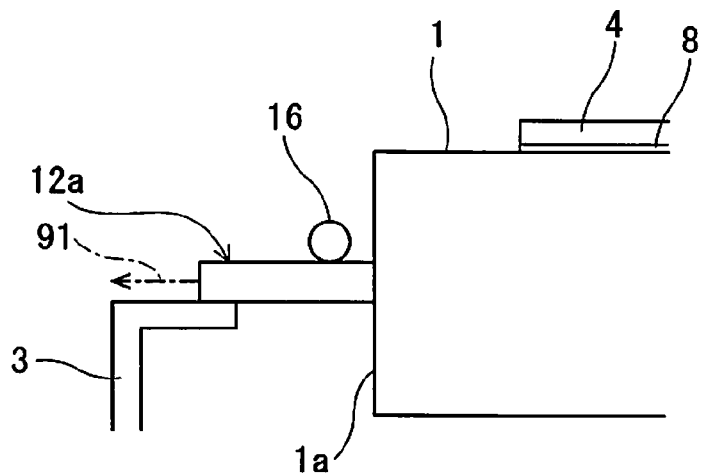
FIG. 14a is a plain view of an example of the solid electrolytic capacitor according to a first modification viewed from side.
Figure 14B:
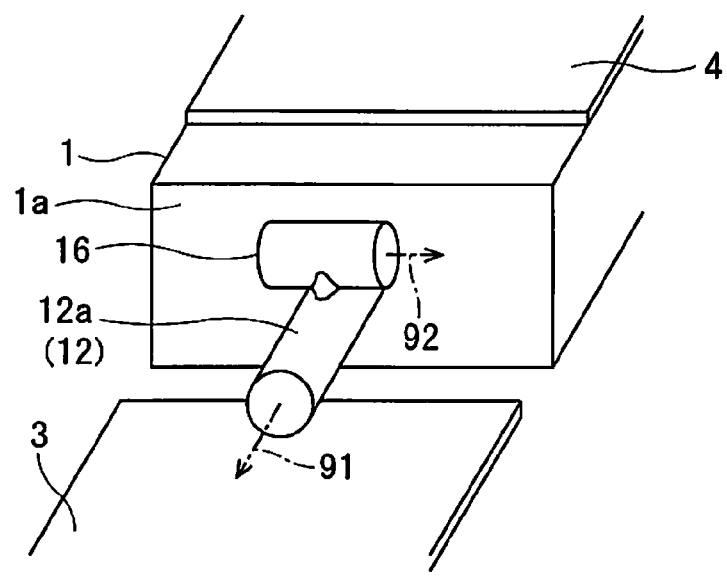

FIG. 14a is a plain view of an example of the solid electrolytic capacitor of the first modification viewed from side, while FIG. 14b is a perspective view of this solid electrolytic capacitor.

As shown in FIGS. 14a and 14b, the outer peripheral surface of the cylindrical projecting part 16 may be in contact with the side surface of the extraction part 12a of the anode lead 12 from above, and the projecting part 16 may be fixed to the anode lead 12 so that the axial direction 92 thereof is generally perpendicular to the axial direction 91 of the anode lead 12.

Figure 15A:
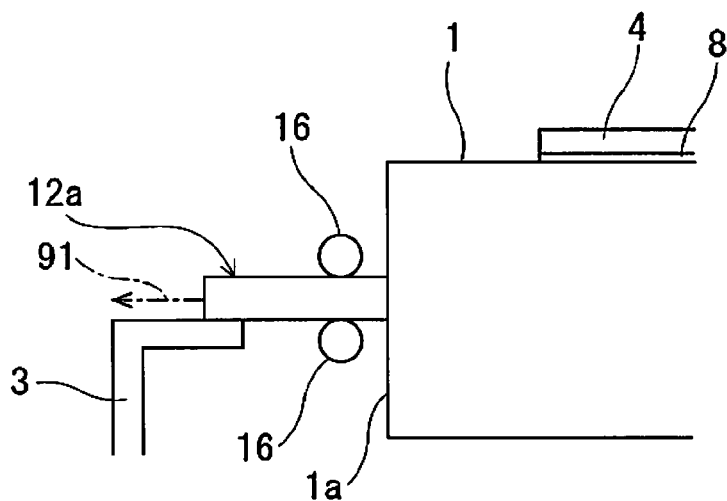
FIG. 15a is a plain view of another example of the solid electrolytic capacitor according to the first modification viewed from side.
Figure 15B:
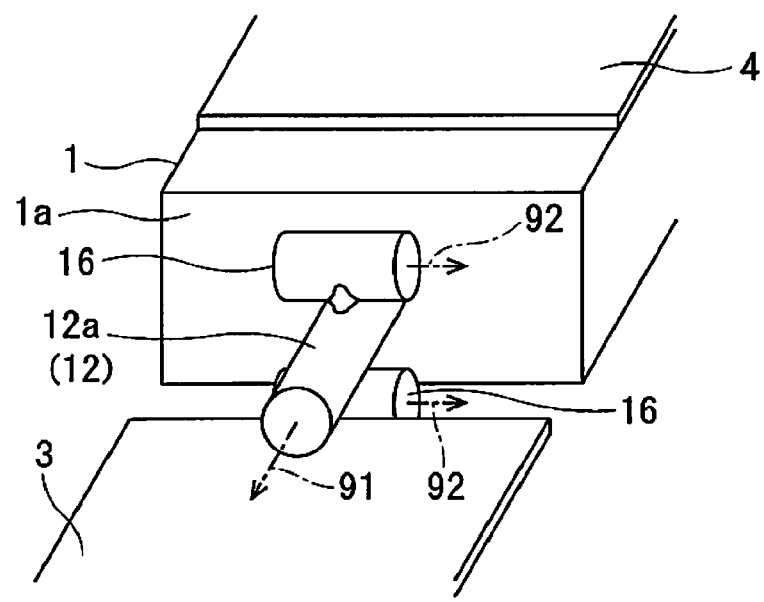

FIG. 15a is a plain view of another example of the solid electrolytic capacitor of the first modification viewed from side, while FIG. 15b is a perspective view of this solid electrolytic capacitor.

As shown in FIGS. 15a and 15b, two cylindrical projecting parts 16 may be fixed to the side surface of the anode lead 12. In the first modification, the outer peripheral surface of one of the two projecting parts 16 is in contact with the side surface of the extraction part 12a of the anode lead 12 from above, and the outer peripheral surface of the other projecting part 16 is in contact with the side surface of the extraction part 12a of the anode lead 12 from below. Also, the axial directions 92 of both two projecting parts 16 are perpendicular to the axial direction 91 of the anode lead 12.

According to the solid electrolytic capacitor of the first modification, in the example shown in FIG. 14a and other example shown in FIG. 15a described above, a crack (defection) or the like is unlikely generated on the dielectric layer 13 of the capacitor element 1 in a similar manner to the solid electrolytic capacitor shown in FIG. 11.

Figure 20:
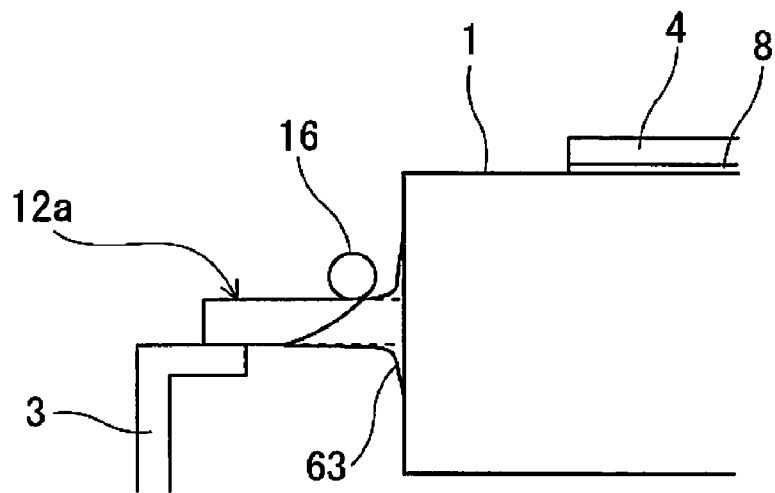
Figure 21:
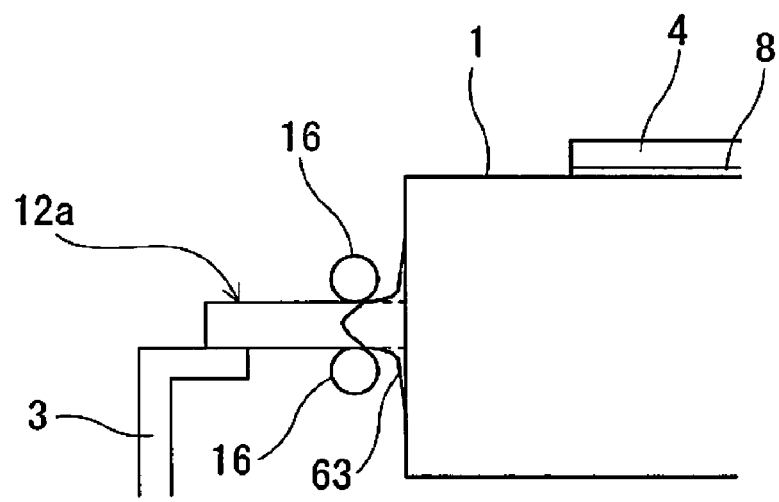

FIGS. 20 and 21 are plain views showing the status of the resin layer 63 in the example shown in FIG. 14a and other example shown in FIG. 15a of the solid electrolytic capacitor described above. As shown in FIGS. 20 and 21, also in the solid electrolytic capacitor of the first modification, the projecting part 16 prevents the resin material forming the resin layer 63 from exuding to the surface of the exterior resin 2 after passing along the side surface of the anode lead 12.

In the solid electrolytic capacitor of another example described above (FIG. 15), more projecting parts 16 are fixed to the anode lead 12 than that in the solid electrolytic capacitor of the example described above (FIG. 14). Therefore, the resin material forming the resin layer 63 is likely to remain in the space between the surface 1a of the capacitor element 1 and the projecting part 16 as shown in FIG. 21.

Figure 16A:
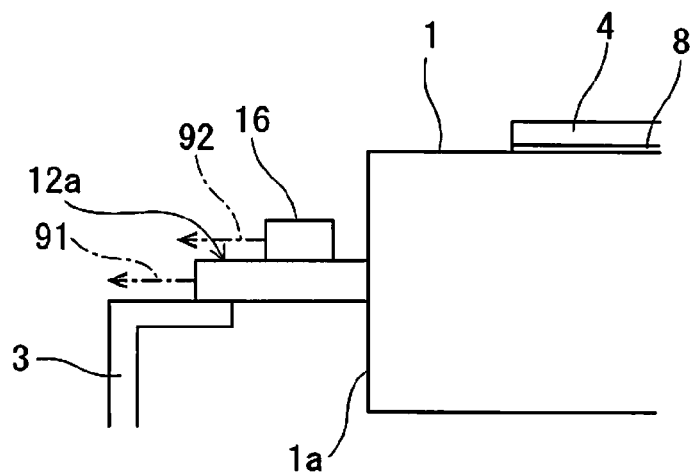
FIG. 16a is a plain view of the solid electrolytic capacitor according to a second modification viewed from side.
Figure 16B:
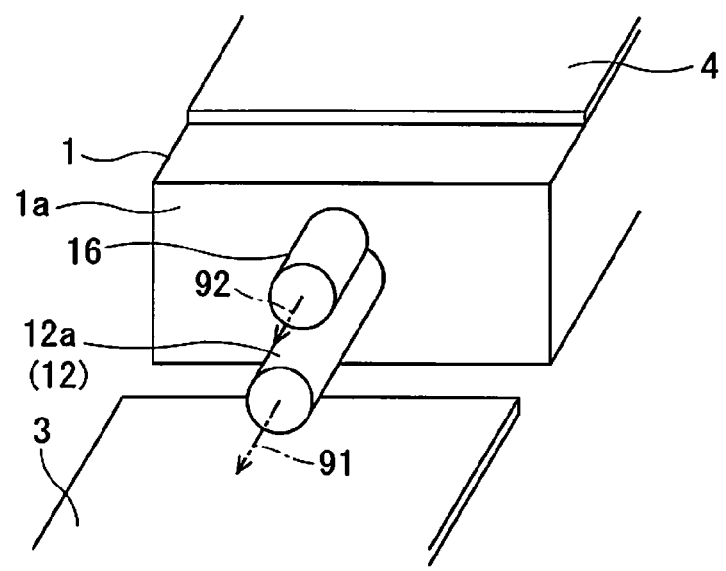
FIG. 16b is a perspective view of the solid electrolytic capacitor according to the second modification.

FIG. 16a is a plain view of the solid electrolytic capacitor of a second modification viewed from side, while FIG. 16b is a perspective view of this solid electrolytic capacitor.

As shown in FIGS. 16a and 16b, the cylindrical projecting part 16 may be fixed to the anode lead 12 so that the outer peripheral surface of the projecting part 16 is in contact with the side surface of the extraction part 12a of the anode lead 12 from above and the axial direction 92 of the projecting part 16 is generally parallel to the axial direction 91 of the anode lead 12.

Also in the solid electrolytic capacitor of the second modification, in a similar manner to the solid electrolytic capacitor shown in FIG. 11, a crack (defection) or the like is unlikely generated on the dielectric layer 13 of the capacitor element 1. In addition, compared to the solid electrolytic capacitor shown in FIG. 11, the contact area of the projecting part 16 and the anode lead 12 increases, and therefore, the weld strength between the projecting part 16 and the anode lead 12 can be enhanced. Thus, even when the stress is applied to the projecting part 16 due to curing shrinkage of the exterior resin 2, the projecting part 16 is not detached from the anode lead 12.

Figure 22:
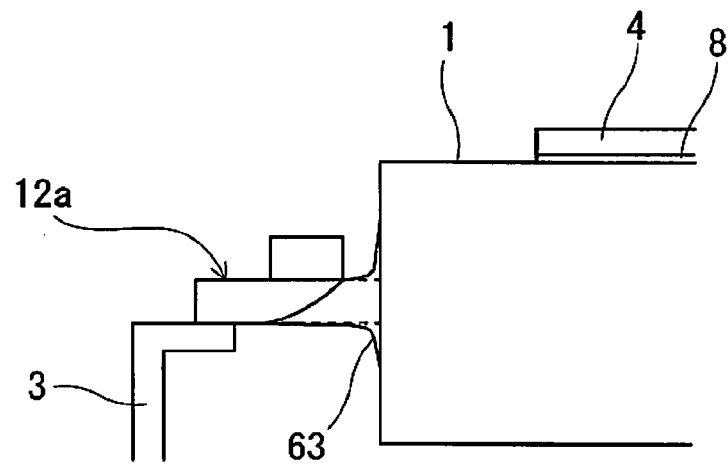
FIG. 22 is a plain view showing a status of a resin layer in the solid electrolytic capacitor of the second modification.

FIG. 22 is a plain view showing the status of the resin layer 63 in the solid electrolytic capacitor of the second modification. As shown in FIG. 22, in the solid electrolytic capacitor of the second modification also, the projecting part 16 prevents the resin material forming the resin layer 63 from exuding to the surface of the exterior resin 2 after passing along the side surface of the anode lead 12.

Figure 17A:
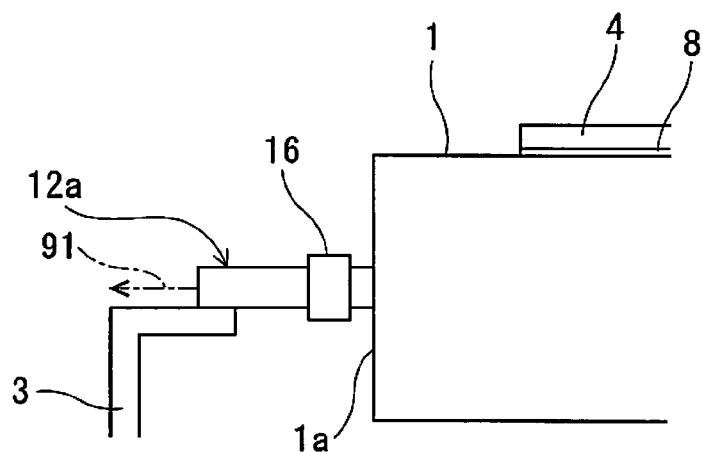
FIG. 17a is a plain view of the solid electrolytic capacitor according to a third modification viewed from side.
Figure 17B:
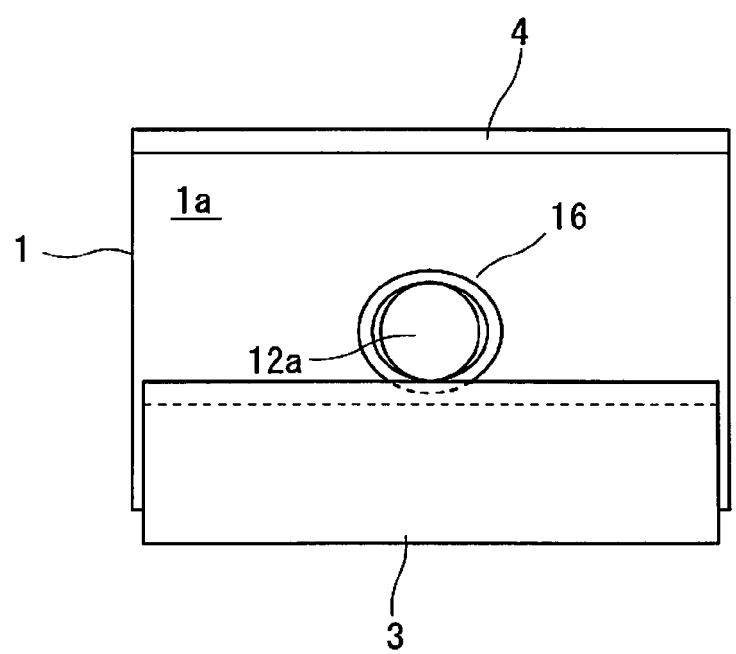
FIG. 17b is a plain view of the solid electrolytic capacitor according to the third modification viewed from side.

FIG. 17a is a plain view of the solid electrolytic capacitor of a third modification viewed from side, while FIG. 17b is a plain view of the surface 1a of the capacitor element 1 of this solid electrolytic capacitor viewed from the axial direction 91 of the anode lead 12.

As shown in FIGS. 17a and 17b, the projecting part 16 may have a tubular shape and fixed to the extraction part 12a, being fitted along the side surface of the extraction part 12a of the anode lead 12. In such a case, in the anode section preparing step, the inner peripheral surface of the projecting part 16 is welded to the side surface of the extraction part 12a. The tubular projecting part 16 may be fixed to the side surface of the extraction part 12a by staking process.

For the tubular projecting part 16, for example, a brass tube is adopted. Also, in the case where the anode lead 12 has a diameter of 0.3 mm, for the tubular projecting part 16, used is a tube having an inner diameter of 0.4 mm, and an outer diameter of 0.6 mm.

In the solid electrolytic capacitor of the third modification also, a crack (defection) or the like is unlikely generated on the dielectric layer 13 of the capacitor element 1 in a similar manner to the solid electrolytic capacitor shown in FIG. 11.

Figure 23:
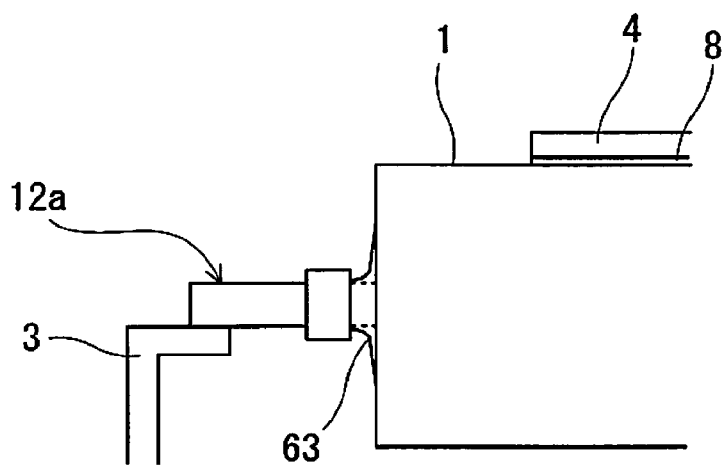
FIG. 23 is a plain view showing a status of a resin layer in the solid electrolytic capacitor of the third modification.

FIG. 23 is a plain view showing the status of the resin layer 63 in the solid electrolytic capacitor of the third modification. As shown in FIG. 23, in the solid electrolytic capacitor of the third modification, the projecting part 16 is formed around an axis of the anode lead 12 entirely, and therefore, the resin material forming the resin layer 63 remains in the space between the surface 1a of the capacitor element 1 and the projecting part 16. Thus, the projecting part 16 prevents the resin material forming the resin layer 63 from exuding to the surface of the exterior resin 2 after passing along the side surface of the anode lead 12.

Figure 18A:
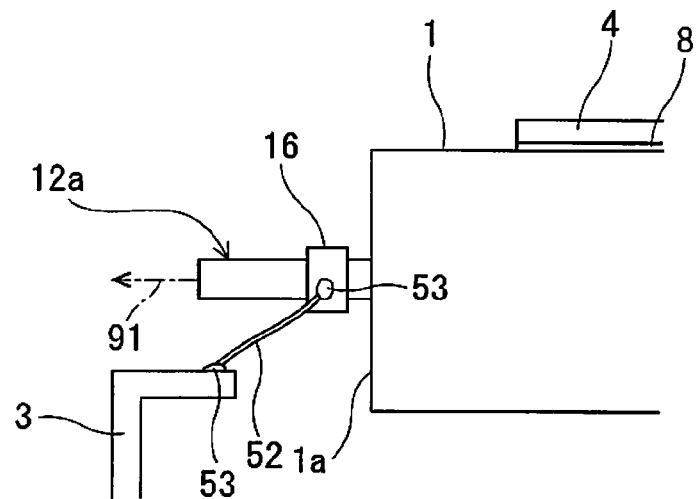
FIG. 18a is a plain view of an example of the solid electrolytic capacitor according to a fourth modification viewed from side.
Figure 18B:
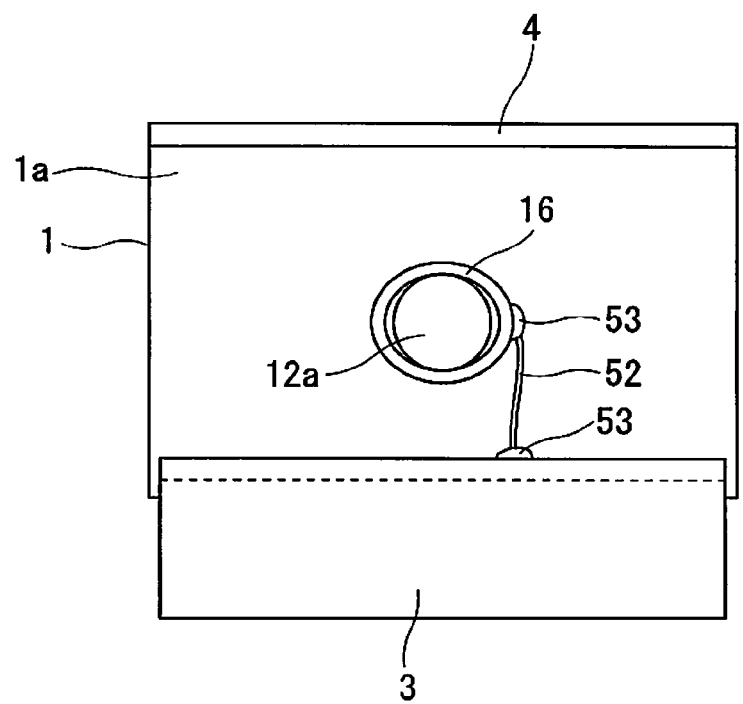

FIG. 18a is a plain view of an example of the solid electrolytic capacitor of a fourth modification viewed from side, while FIG. 18b is a plain view of the surface 1a of the capacitor element 1 of this solid electrolytic capacitor viewed from the axial direction 91 of the anode lead 12.

As shown in FIGS. 18a and 18b, the anode terminal 3 and the anode lead 12 may be electrically connected to each other by a metal wire 52. In particular, the projecting part 16 has a tubular shape, and formed by a metal capable of being soldered with the metal wire 52, such as, for example, brass, iron, or steel. The metal wire 52 is connected to the projecting part 16 by soldering, and the anode terminal 3 is electrically connected to the projecting part 16 via the metal wire 52. In FIGS. 18a and 18b, the solder is indicated by a reference symbol 53.

For the connection of the anode terminal 3 and the anode lead 12 via the metal wire 52, it is possible to adopt not only soldering, but also ultrasonic jointing or the like.

Figure 19A:
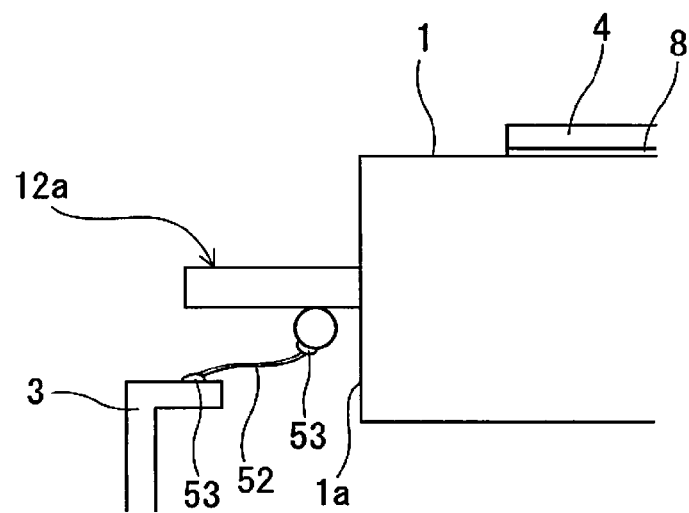
FIG. 19a is a plain view of another example of the solid electrolytic capacitor according to the fourth modification viewed from side.
Figure 19B:
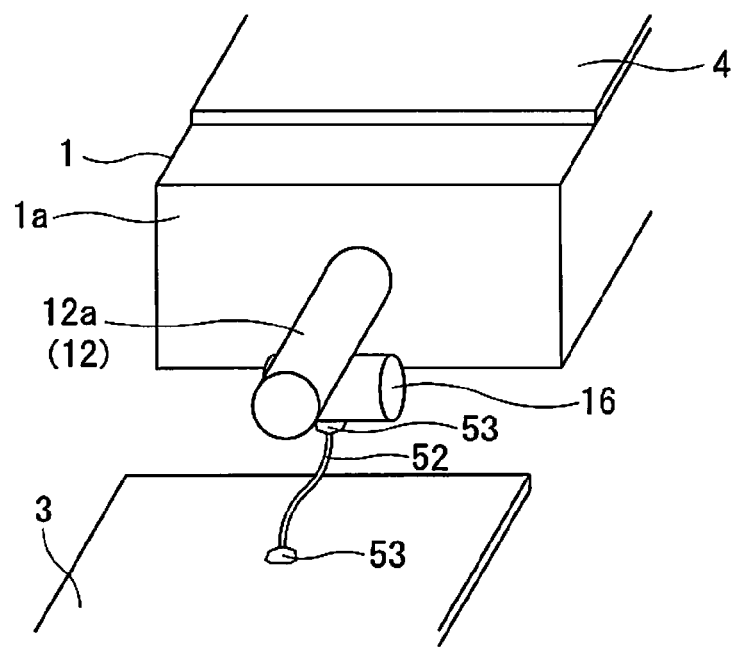

FIG. 19a is a plain view of another example of the solid electrolytic capacitor of the fourth modification viewed from side, while FIG. 19b is a perspective view of this solid electrolytic capacitor. As shown in FIGS. 19a and 19b, the projecting part 16 formed by a metal capable of being soldered with the metal wire 52 may have a cylindrical shape.

In the case where niobium or titanium is used for the anode lead 12, it has been difficult to attach the metal wire 52 to the anode lead 12 by soldering. However, according to the fourth modification, by using a metal material capable of soldering for the projecting part 16, such as, for example, brass, iron, or steel, it is possible to electrically connect the metal wire 52 and the anode lead 12 by soldering the metal wire 52 to the projecting part 16.

Therefore, according to the solid electrolytic capacitor of the fourth modification, in either of the example shown in FIG. 18a or other example shown in FIG. 19a described above, it is possible to connect the metal wire 52 to the projecting part 16 by soldering, and therefore, the force applied to the extraction part 12a of the anode lead 12 is reduced compared to that in the structure in which the extraction part 12a of the anode lead 12 and the anode terminal 3 are electrically connected to each other by welding. As a result, the stress applied to the base part of the extraction part 12a is reduced. Thus, in the process of electrically connecting the anode lead 12 and the anode terminal 3 to each other, a crack (defection) or the like is unlikely generated on the dielectric layer 13.

Also in the solid electrolytic capacitor according to the fourth modification, in a similar manner to the solid electrolytic capacitor shown in FIG. 11, a crack (defection) or the like is unlikely generated on the dielectric layer 13 of the capacitor element 1 even in the case of curing shrinkage of the exterior resin 2.

Figure 24:
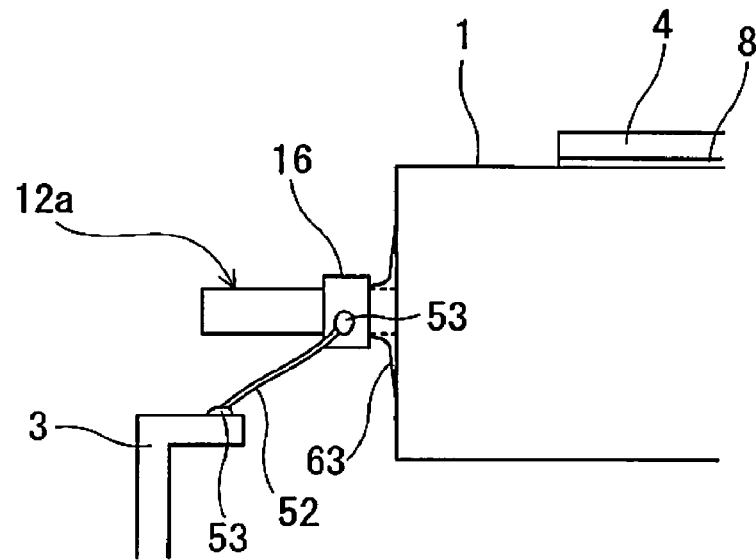
Figure 25:
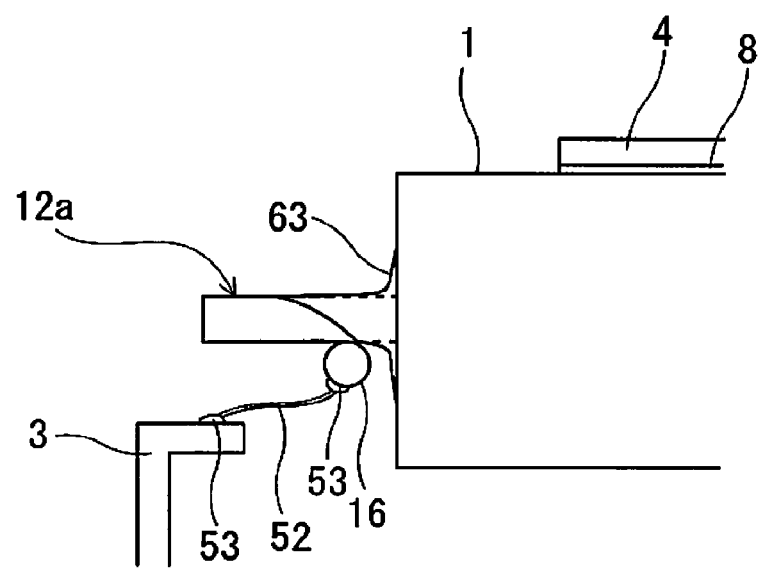

FIGS. 24 and 25 are plain views showing the status of the resin layer 63 in the example shown in FIG. 18a and other example shown in FIG. 19a of the solid electrolytic capacitor of the fourth modification described above. As shown in FIGS. 24 and 25, in the solid electrolytic capacitor according to the fourth modification also, the projecting part 16 prevents the resin material forming the resin layer 63 from exuding to the surface of the exterior resin 2 after passing along the side surface of the anode lead 12.

In the embodiment described above, the projecting part 16 is fixed to the anode lead 12 by welding in the anode section preparing step after the compact is sintered to form the porous sintered body in the anode body forming step. However, in the case where a metal piece is used as the projecting part 16, it is possible to fix the projecting part 16 to the anode lead 12 by welding before the compact is sintered, because the metal piece to be the projecting part 16 is not deformed at the temperature at which the compact is sintered.

Thereby prevented is a damage of the capacitor element 1, in particular a damage of the anode body 11, due to the fixing of the projecting part 16 to the anode lead 12.

Also, in the case where the projecting part 16 is fixed to the anode lead 12 before the compact is sintered, it is possible to further enhance the adhesive strength between the anode lead 12 and the projecting part 16 by utilizing the heat applied in the sintering of the compact.

The present invention is not limited to the foregoing second embodiment in construction but can be modified variously within the technical range set forth in the appended claims. For example, the shape of the projecting part 16 and the configuration of the fixing of the projecting part 16 to the anode lead 12 are not limited to the above described embodiment, but it is possible to adopt various shapes and configurations of the fixing as long as the projecting part 16 can be received by the exterior resin 2 interposed between the surface 1a of the capacitor element 1 and the projecting part 16.

Also, for the projecting part 16, it is possible to utilize an offcut of the anode lead generated in the manufacturing process of the solid electrolytic capacitor. Thereby it is possible to effectively utilize resource and reduce the manufacturing cost of the solid electrolytic capacitor.

Also, the anode lead 12 and the projecting part 16 may be formed integrally.

Further, in the case where the projecting part 16 is formed by a valve metal, it is possible to form a dielectric layer also on the exposed surface of the projecting part 16 by anodic oxidation. In such a case, it is possible that the dielectric layer formed on the projecting part 16 inhibits the contact between the projecting part 16 and the cathode layer 15. Also, the electrolyte layer 14 and the cathode layer 15 may be formed also on the surface of the dielectric layer 13 formed on the projecting part 16.

Further, only the resin layer 63 may be interposed between the projecting part 16 and the surface 1a, from which the anode lead 12 is extracted, among the outer peripheral surfaces of the capacitor element 1. In such a case, for the resin layer 63, used is a material as soft as or softer than the exterior resin 2. Thereby the projecting part 16 is received by the resin layer 63 in a similar manner to the structure in which a part of the exterior resin 2 is interposed between the surface 1a of the capacitor element 1 and the projecting part 16, and therefore, the extraction part 12a of the anode lead 12 is inhibited from further intruding in the capacitor element 1.

What is claimed is:

1. A solid electrolytic capacitor comprising a capacitor element, an exterior resin covering the capacitor element, an anode terminal, a cathode terminal, and a metal wire,
   the capacitor element comprising an anode body from which an anode lead is extracted, a dielectric layer formed on a surface of the anode body, and a cathode layer formed on the dielectric layer,
   the anode terminal and the cathode terminal being electrically connected to the anode lead and the cathode layer, respectively, and extracted to an outer surface of the exterior resin, the anode terminal including an opposing part opposed to the anode lead in the exterior resin, and
   the metal wire including both ends connected to the opposing part and a curving part, and being provided to the anode lead, at least a part of the curving part being electrically connected to the anode lead.

2. The solid electrolytic capacitor according to claim 1, wherein the curving part of the metal wire has flexibility.

3. The solid electrolytic capacitor according to claim 1, wherein the curving part of the metal wire has any of a U-shape, a loop shape, and an M-shape, and the curving part and the anode lead intersect each other.

4. The solid electrolytic capacitor according to claim 1, wherein the anode lead and the anode terminal are separated from each other.

5. The solid electrolytic capacitor according to claim 1, wherein the solid electrolytic capacitor further comprises a resin layer covering at least a part of a periphery of the metal wire and the anode lead, and the resin layer is formed by a gel-like or rubber-like material.

6. The solid electrolytic capacitor according to claim 1, wherein a tip of the anode lead and the curving part of the metal wire are electrically connected to each other by a conductive part, and the conductive part is formed by a conductive resin having curability.

* * * * *